US012416896B2

(12) United States Patent
Itabashi et al.

(10) Patent No.: US 12,416,896 B2
(45) **Date of Patent: *Sep. 16, 2025**

(54) DEVELOPING CARTRIDGE PROVIDED WITH COVER

(71) Applicant: BROTHER KOGYO KABUSHIKI KAISHA, Nagoya (JP)

(72) Inventors: Nao Itabashi, Nagoya (JP); Naoya Kamimura, Ichinomiya (JP); Ryuya Yamazaki, Nagoya (JP); Hideshi Nishiyama, Owariasahi (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/342,075

(22) Filed: Jun. 27, 2023

(65) Prior Publication Data

US 2024/0004343 A1 Jan. 4, 2024

Related U.S. Application Data

(63) Continuation of application No. 17/475,485, filed on Sep. 15, 2021, now Pat. No. 11,733,646, which is a (Continued)

(30) Foreign Application Priority Data

Aug. 31, 2011 (JP) ................................ 2011-190037

(51) Int. Cl.

*G03G 21/18* (2006.01)
*G03G 15/08* (2006.01)
*G03G 21/16* (2006.01)

(52) U.S. Cl.

CPC ..... *G03G 21/1821* (2013.01); *G03G 15/0865* (2013.01); *G03G 21/1647* (2013.01); (Continued)

(58) Field of Classification Search

CPC .......... G03G 21/1647; G03G 21/1821; G03G 21/1857; G03G 21/1864

See application file for complete search history.

(56) References Cited

U.S. PATENT DOCUMENTS 5,581,328 A 12/1996 Yashiro
D471,228 S 3/2003 Okabe et al.
(Continued)

FOREIGN PATENT DOCUMENTS

CN 1428666 A 7/2003
CN 1828447 A 9/2006
(Continued)

OTHER PUBLICATIONS

Sep. 27, 2018—(CN) Notification of the First Office Action—App 201510029415.6.
(Continued)

*Primary Examiner* — Erika J. Villaluna
(74) *Attorney, Agent, or Firm* — Merchant & Gould P.C.

(57) ABSTRACT

A process cartridge including: a photosensitive member cartridge including a photosensitive member; and a developing cartridge including a developer carrier. The developing cartridge further includes: an inputting portion; a first cover; and a second cover. The first cover has a first engagement portion configured to move the developer carrier away from the photosensitive member. The first engagement portion is positioned between an axis of the developer carrier extending in an axial direction and an axis of the inputting portion extending in the axial direction, when projected in the axial direction. The second cover has a second engagement portion configured to move the developer carrier away from the photosensitive member. The second engagement portion is positioned between the axis of
(Continued)

11 the developer carrier and the axis of the inputting portion, when projected in the axial direction.

11 Claims, 15 Drawing Sheets

Related U.S. Application Data continuation of application No. 17/155,396, filed on Jan. 22, 2021, now Pat. No. 11,669,043, which is a continuation of application No. 16/829,909, filed on Mar. 25, 2020, now Pat. No. 10,901,361, which is a continuation of application No. 16/408,999, filed on May 10, 2019, now Pat. No. 10,620,580, which is a continuation of application No. 16/032,135, filed on Jul. 11, 2018, now Pat. No. 10,303,112, which is a continuation of application No. 15/866,939, filed on Jan. 10, 2018, now Pat. No. 10,048,645, which is a continuation of application No. 15/351,827, filed on Nov. 15, 2016, now Pat. No. 9,891,581, which is a continuation of application No. 15/078,362, filed on Mar. 23, 2016, now Pat. No. 9,529,302, which is a continuation of application No. 13/599,335, filed on Aug. 30, 2012, now Pat. No. 9,323,214.

(52) U.S. Cl.
CPC ..... *G03G 21/1676* (2013.01); *G03G 21/1857* (2013.01); *G03G 21/1864* (2013.01)

(56) References Cited

U.S. PATENT DOCUMENTS

| | | | |
|---|---|---|---|
| D471,583 | S | 3/2003 | Okabe et al. |
| 7,463,834 | B2 | 12/2008 | Takagi et al. |
| 7,643,770 | B2 | 1/2010 | Sato et al. |
| 7,693,442 | B2 | 4/2010 | Sato et al. |
| 7,693,443 | B2 | 4/2010 | Sato et al. |
| 7,860,437 | B2 | 12/2010 | Kakuta et al. |
| 8,014,694 | B2 | 9/2011 | Sato et al. |
| 8,185,023 | B2 | 5/2012 | Kakuta et al. |
| 8,213,826 | B2 | 7/2012 | Sato et al. |
| 8,532,544 | B2 | 9/2013 | Kakuta et al. |
| 9,323,214 | B2 | 4/2016 | Itabashi et al. |
| 9,529,302 | B2 | 12/2016 | Itabashi et al. |
| 9,891,581 | B2 | 2/2018 | Itabashi et al. |
| 10,048,645 | B2 | 8/2018 | Itabashi et al. |
| 2003/0049046 | A1 | 3/2003 | Okabe |
| 2006/0008289 | A1 | 1/2006 | Sato et al. |
| 2006/0193643 | A1 | 8/2006 | Takagi et al. |
| 2007/0009281 | A1 | 1/2007 | Sato et al. |
| 2007/0009282 | A1 | 1/2007 | Sato et al. |
| 2007/0059018 | A1 | 3/2007 | Tokuda |
| 2008/0205928 | A1 | 8/2008 | Ishikawa |
| 2008/0247784 | A1 | 10/2008 | Kakuta et al. |
| 2008/0298838 | A1 | 12/2008 | Sato et al. |
| 2009/0297208 | A1 | 12/2009 | Suzuki et al. |
| 2009/0304412 | A1 | 12/2009 | Hattori et al. |
| 2009/0317134 | A1 | 12/2009 | Miyabe et al. |
| 2009/0317135 | A1 | 12/2009 | Miyabe et al. |
| 2010/0266310 | A1 | 10/2010 | Saiki et al. |
| 2010/0296833 | A1 | 11/2010 | Sato et al. |
| 2011/0064463 | A1 | 3/2011 | Hashimoto et al. |
| 2011/0076062 | A1 | 3/2011 | Kakuta et al. |
| 2011/0299875 | A1 | 12/2011 | Sato et al. |
| 2012/0163859 | A1 | 6/2012 | Hashimoto et al. |
| 2012/0170955 | A1 | 7/2012 | Kakuta et al. |
| 2012/0251187 | A1 | 10/2012 | Sato et al. |
| 2012/0321342 | A1 | 12/2012 | Mori |
| 2013/0051849 | A1 | 2/2013 | Itabashi et al. |
| 2014/0044453 | A1 | 2/2014 | Sato et al. |
| 2014/0044454 | A1 | 2/2014 | Sato et al. |
| 2014/0044455 | A1 | 2/2014 | Sato et al. |
| 2014/0050508 | A1 | 2/2014 | Sato et al. |
| 2015/0185691 | A1 | 7/2015 | Itabashi et al. |
| 2016/0202631 | A1 | 7/2016 | Itabashi et al. |
| 2017/0060082 | A1 | 3/2017 | Itabashi et al. |
| 2018/0129159 | A1 | 5/2018 | Itabashi et al. |

FOREIGN PATENT DOCUMENTS

| | | | |
|---|---|---|---|
| CN | 1900849 | A | 1/2007 |
| CN | 101236380 | A | 8/2008 |
| CN | 101614987 | A | 12/2009 |
| CN | 102968036 | A | 3/2013 |
| JP | 2001282079 | A | 10/2001 |
| JP | 2003-084647 | A | 3/2003 |
| JP | 2006-023340 | A | 1/2006 |
| JP | 2007-047402 | A | 2/2007 |
| JP | 2009-086442 | A | 4/2009 |
| JP | 2009-162904 | A | 7/2009 |
| JP | 2009-282076 | A | 12/2009 |
| JP | 2009-288286 | A | 12/2009 |
| JP | 2010-026501 | A | 2/2010 |

OTHER PUBLICATIONS

Sep. 27, 2018—(CN) Notification of the First Office Action—App 201510029029.7.

Office Action issued in corresponding Chinese Application No. 201210324575 mailed Mar. 4, 2014.

Jun. 30, 2015—(JP) Office Action—App 2011-190037.

Feb. 10, 2017—(JP) Office Action—App 2016/023411.

11

DEVELOPING CARTRIDGE PROVIDED WITH COVER

CROSS REFERENCE TO RELATED APPLICATION

This application is a continuation application of U.S. patent application Ser. No. 17/475,485, filed Sep. 15, 2021, now U.S. Pat. No. 11,733,646 issued Aug. 22, 2023, which is a continuation application U.S. patent application Ser. No. 17/155,396, filed Jan. 22, 2021, now U.S. Pat. No. 11,669,043, issued Jun. 6, 2023, which is a continuation application of U.S. patent application Ser. No. 16/829,909, filed Mar. 25, 2020, now U.S. Pat. No. 10,901,361, issued Jan. 26, 2021, which is a continuation application of U.S. patent application Ser. No. 16/408,999, filed May 10, 2019, now U.S. Pat. No. 10,620,580, issued Apr. 14, 2020, which is a continuation application of U.S. patent application Ser. No. 16/032,135, filed Jul. 11, 2018, now U.S. Pat. No. 10,303,112, issued May 28, 2019, which is a continuation of U.S. patent application Ser. No. 15/866,939, filed Jan. 10, 2018, now U.S. Pat. No. 10,048,645, issued Aug. 14, 2018, which is a continuation of U.S. patent application Ser. No. 15/351,827, filed Nov. 15, 2016, now U.S. Pat. No. 9,891,581, issued Feb. 13, 2018, which is a continuation of U.S. patent application Ser. No. 15/078,362, filed Mar. 23, 2016, now U.S. Pat. No. 9,529,302, issued Dec. 27, 2016, which is a continuation of U.S. patent application Ser. No. 13/599,335, filed Aug. 30, 2012, now U.S. Pat. No. 9,323,214, issued Apr. 26, 2016, which claims priority from Japanese Patent Application No. 2011-190037 filed Aug. 31, 2011. The contents of the above noted applications are incorporated herein by reference in their entirety.

TECHNICAL FIELD

The present invention relates to a process cartridge and a developing cartridge, detachably mountable in an electrophotographic type image forming device.

BACKGROUND

Known is an electrophotographic type printer provided with a process cartridge. The process cartridge includes a drum cartridge having a photosensitive drum, and a developing cartridge having a developing roller for supplying toner to the photosensitive drum. The process cartridge is detachably mountable in the printer.

Such a printer has a known configuration such that the developing roller of the developing cartridge contacts the photosensitive drum to supply the toner to the photosensitive drum when an image is formed, and is separated from the photosensitive drum not to supply the toner to the photosensitive drum when an image is not formed.

For example, the developing cartridge has right and left side walls on which engagement protrusions are respectively provided. The drum cartridge has right and left side walls on which front nipping levers and rear nipping levers are respectively provided. Each engagement protrusion is nipped by the front nipping lever and the rear nipping lever, so that the developing cartridge is brought into contact with and separated from the photosensitive drum.

With this configuration, the rear nipping levers respectively press the engagement protrusions of the developing cartridge toward the photosensitive drum. Thus, the developing cartridge normally contacts the photosensitive drum. Further, to separate the developing cartridge from the photosensitive drum, the front nipping levers respectively press the engagement protrusions of the developing cartridge forward against the pressing force from the rear nipping levers.

SUMMARY

In the above-described configuration, it is required to provide the engagement protrusions on both of the right and left side walls of the developing cartridge.

In general, there are many parts and components on the right and left side walls of the developing cartridge for receiving a drive force and an electric power supplied from a main casing side, other than the engagement protrusions.

For this reason, when downsizing of the developing cartridge is attempted, it is difficult to secure a space for installing the engagement protrusions on the right and left side walls of the developing cartridge. This may decrease a degree of freedom in designing the developing cartridge.

In view of the foregoing, it is an object of the present invention to provide a process cartridge and a developing cartridge, capable of enhancing a degree of freedom in design of the developing cartridge while downsizing the developing cartridge.

In order to attain the above and other objects, the present invention provides a process cartridge including: a photosensitive member cartridge; and a developing cartridge. The photosensitive member cartridge includes a photosensitive member. The developing cartridge includes: a developing cartridge frame; a developer carrier; a first gear; a second gear; an inputting portion; a first cover; and a second cover. The developing cartridge frame defines an internal space for accommodating a developing agent therein. The developer carrier is rotatably supported in the developing cartridge frame and arranged in confrontation with the photosensitive member to supply the developing agent to the photosensitive member. The developer carrier has an axis extending in an axial direction. The developing cartridge frame has a first side and a second side opposite to the first side in the axial direction. The first gear is disposed at the first side. The second gear is disposed at the second side. The inputting portion has an axis parallel to the axial direction and is rotatable about the axis of the inputting portion in response to an external drive force to transmit the external drive force to the first gear. The first cover covers at least a part of the first gear and has a first engagement portion configured to move the developer carrier away from the photosensitive member. The first engagement portion is positioned between the axis of the developer carrier and the axis of the inputting portion when projected in the axial direction. The second cover covers at least a part of the second gear and has a second engagement portion configured to move the developer carrier away from the photosensitive member. The second engagement portion is positioned between the axis of the developer carrier and the axis of the inputting portion when projected in the axial direction.

According to another aspect, the present invention provides a developing cartridge including: a developing cartridge frame; a developer carrier; a first gear; a second gear; an inputting portion; a first cover; and a second cover. The developing cartridge frame defines an internal space for accommodating a developing agent therein. The developer carrier is configured to rotate and has an axis extending in an axial direction. The developing cartridge frame has a first side and a second side opposite to the first side in the axial direction. The first gear is disposed at the first side. The second gear is disposed at the second side. The inputting portion has an axis parallel to the axial direction and is rotatable about the axis of the inputting portion in response to an external drive force to transmit the external drive force to the first gear. The first cover covers at least a part of the first gear and has a first engagement portion configured to move the developer carrier in a perpendicular direction perpendicular to the axial direction. The first engagement portion is positioned between the axis of the developer carrier and the axis of the inputting portion when projected in the axial direction. The second cover covers at least a part of the second gear and has a second engagement portion configured to move the developer carrier in the perpendicular direction. The second engagement portion is positioned between the axis of the developer carrier and the axis of the inputting portion when projected in the axial direction.

BRIEF DESCRIPTION OF THE DRAWINGS

The particular features and advantages of the invention as well as other objects will become apparent from the following description taken in connection with the accompanying drawings, in which:

FIGS. 6A and 6B are explanatory diagrams illustrating guiding of the developing cartridge by a lock lever, in which FIG. 6A is an enlarged view of a left portion of the developing cartridge in the process of being guided by the lock lever, and FIG. 6B is an enlarged view of the left portion of the developing cartridge after having been guided by the lock lever;

DETAILED DESCRIPTION

Figure 1:
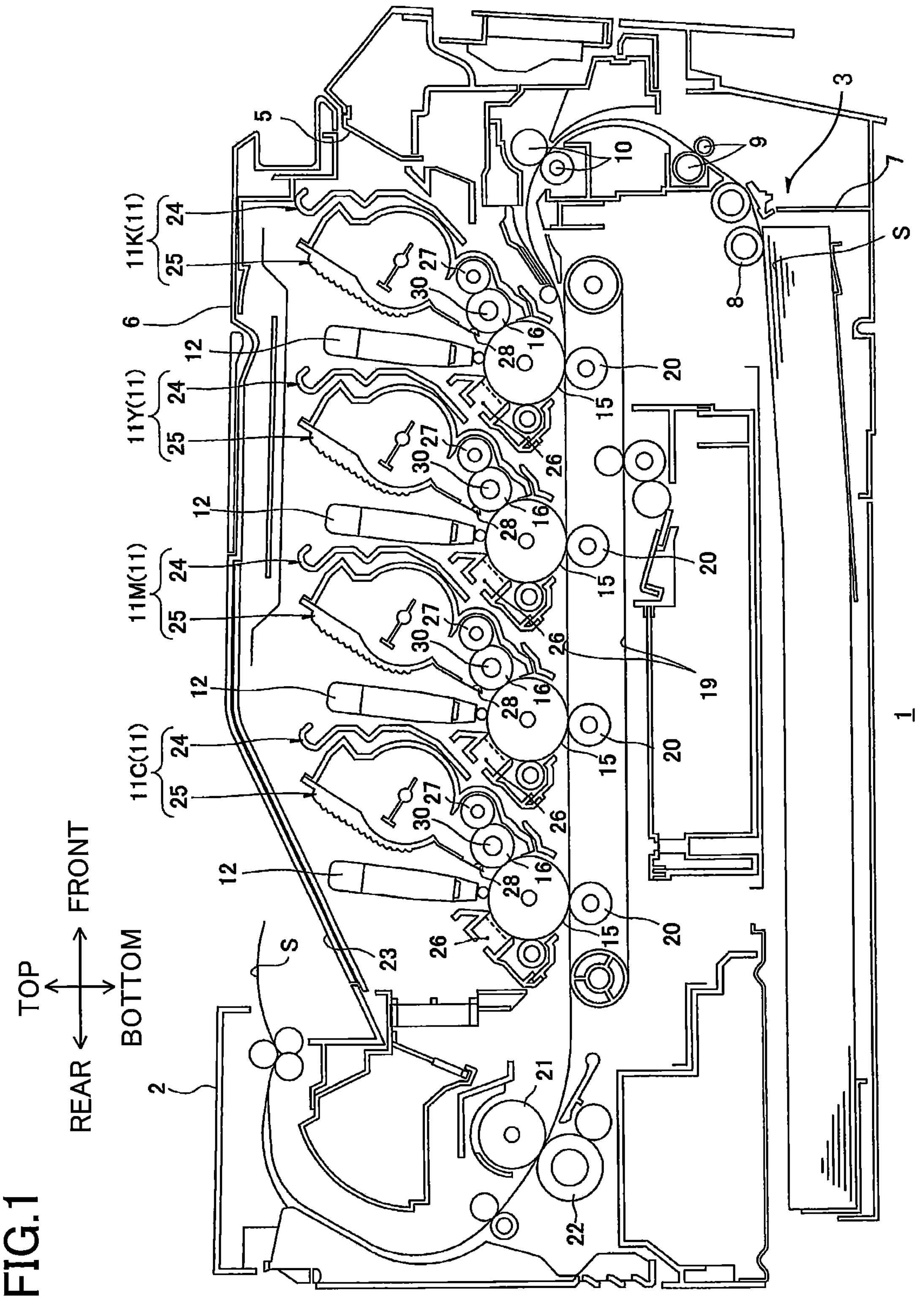
FIG. 1 is a cross-sectional view of a printer in which a process cartridge according to a first embodiment of the present invention is provided.

A process cartridge and a developing cartridge according to a first embodiment of the present invention, detachably mountable in an image forming device, will be described while referring to FIGS. 1 through 9 wherein like parts and components are designated by the same reference numerals to avoid duplicating description.

1. Overall Structure of Color Printer

As shown in FIG. 1, the image forming device is a horizontal direct tandem type color printer 1.

The terms “upward”, “downward”, “upper”, “lower”, “above”, “below”, “beneath”, “right”, “left”, “front”, “rear” and the like will be used throughout the description assuming that the printer 1 is disposed in an orientation in which it is intended to be used. In the following description, the right side in FIG. 1 will be referred to as the front side of the printer 1, and the left side in FIG. 1 will be referred to as the rear side of the printer 1. Top, bottom, left, and right sides of the printer 1 in the following description will be based on the reference point of a user viewing the printer 1 from the front side. The near side in FIG. 1 will be referred to as the left side of the printer 1, and the far side in FIG. 1 will be referred to as the right side of the printer 1.

The printer 1 includes a main casing 2 formed in a generally box-shape. The main casing 2 has a top portion at which a top cover 6 is provided. The top cover 6 is pivotally movable about its rear portion between a closed position for closing an opening 5 formed in the main casing 2 and an open position for opening the opening 5. The printer 1 further includes four process cartridges 11 corresponding to each color.

Four of the process cartridges 11 are detachably mounted in the main casing 2, and juxtaposed with each other in a frontward/rearward direction with a space between neighboring process cartridge 11. The process cartridges 11 are disposed at positions above a sheet supply unit 3. Specifically, the process cartridges 11 include a black process cartridge 11K, a yellow process cartridge 11Y, a magenta process cartridge 11M, and a cyan process cartridge 11C arranged in this order from front to rear.

Further, each process cartridge 11 includes a drum cartridge 24 and a developing cartridge 25 detachably mountable in the drum cartridge 24.

The drum cartridge 24 includes a photosensitive drum 15.

The photosensitive drum 15 is formed in a cylindrical shape that is elongated in a rightward/leftward direction (lateral direction). The photosensitive drum 15 is rotatably supported in the drum cartridge 24.

The developing cartridge 25 includes a developing roller 16.

The developing roller 16 includes a developing roller shaft 30 made of metal and extending in the rightward/leftward direction. That is, the developing roller 16 is oriented with its axis in the rightward/leftward direction. The rightward/leftward direction corresponds to an axial direction. The developing roller 16 is rotatably supported to the developing cartridge 25 so that a rear edge of the developing roller 16 is exposed through a rear edge of the developing cartridge 25 and contacts the corresponding photosensitive drum 15 from an upper front side thereof. That is, the developing roller 16 is in confrontation with the photosensitive drum 15. The developing roller 16 is rotatable about an axis A1 (FIGS. 7 and 8) of the developing roller shaft 30 extending in the rightward/leftward direction, that is, in the axial direction.

Further, the developing cartridge 25 includes a supply roller 27 for supplying toner to the developing roller 16, and a thickness-regulating blade 28 for regulating the thickness of the toner supplied to the developing roller 16. Toner is accommodated in a space defined above the supply roller 27 and the thickness-regulating blade 28. That is, toner is accommodated in an internal space defined by a cartridge frame 51 (described later) of the developing cartridge 25.

The toner accommodated in the developing cartridge 25 is supplied onto the supply roller 27, which in turn supplies the toner to the developing roller 16. The toner is positively turbocharged between the supply roller 27 and the developing roller 16. A uniform thin layer of toner is carried on a surface of the developing roller 16.

In the meantime, a Scorotron charger 26 applies a uniform charge of positive polarity to a surface of the corresponding photosensitive drum 15. Subsequently, an LED unit 12 exposes the surface of the corresponding photosensitive drum 15 to light based on prescribed image data. An electrostatic latent image corresponding to the image data is formed on the surface of the photosensitive drum 15. The toner carried on the surface of the developing roller 16 is supplied to the electrostatic latent image formed on the surface of the photosensitive drum thereby forming a toner image (developing agent image) on the surface of the photosensitive drum 15.

A sheet supply tray 7 is disposed at a bottom portion of the main casing 2 and accommodates sheets of paper S therein. Each sheet S is conveyed upward and then rearward along a U-shaped path by a pickup roller 8, a sheet supply roller 9, and a pair of registration rollers 10, and further conveyed toward a position between the photosensitive drums 15 and a conveying belt 19 at a prescribed timing. The conveying belt 19 conveys the sheet S rearward so that the sheet S passes sequentially through each position between the photosensitive drums and corresponding transfer rollers 20. At this time, toner images in each color carried on the respective photosensitive drums 15 are sequentially transferred onto the sheet S to form a color image.

As the sheet S passes between a heating roller 21 and a pressure roller 22, the color image is thermally fixed onto the sheet S by heat and pressure.

After the color image has been fixed onto the sheet S, the sheet S is conveyed upward and then frontward along a U-shaped path to be discharged onto a discharge tray 23 provided at the top cover 6.

2. Process Cartridge (1) Drum Cartridge (1-1) Drum Frame

Note that directions related to the drum cartridge 24 in the following description will be referred based on its position when the drum cartridge 24 is disposed at a horizontal plane in an orientation such that a bottom wall 35 of the drum cartridge 24 is positioned at a bottom side (FIG. 2), unless otherwise specified. A side of the drum cartridge 24 at which the photosensitive drum 15 is disposed will be referred to as a rear side.

Figure 2:
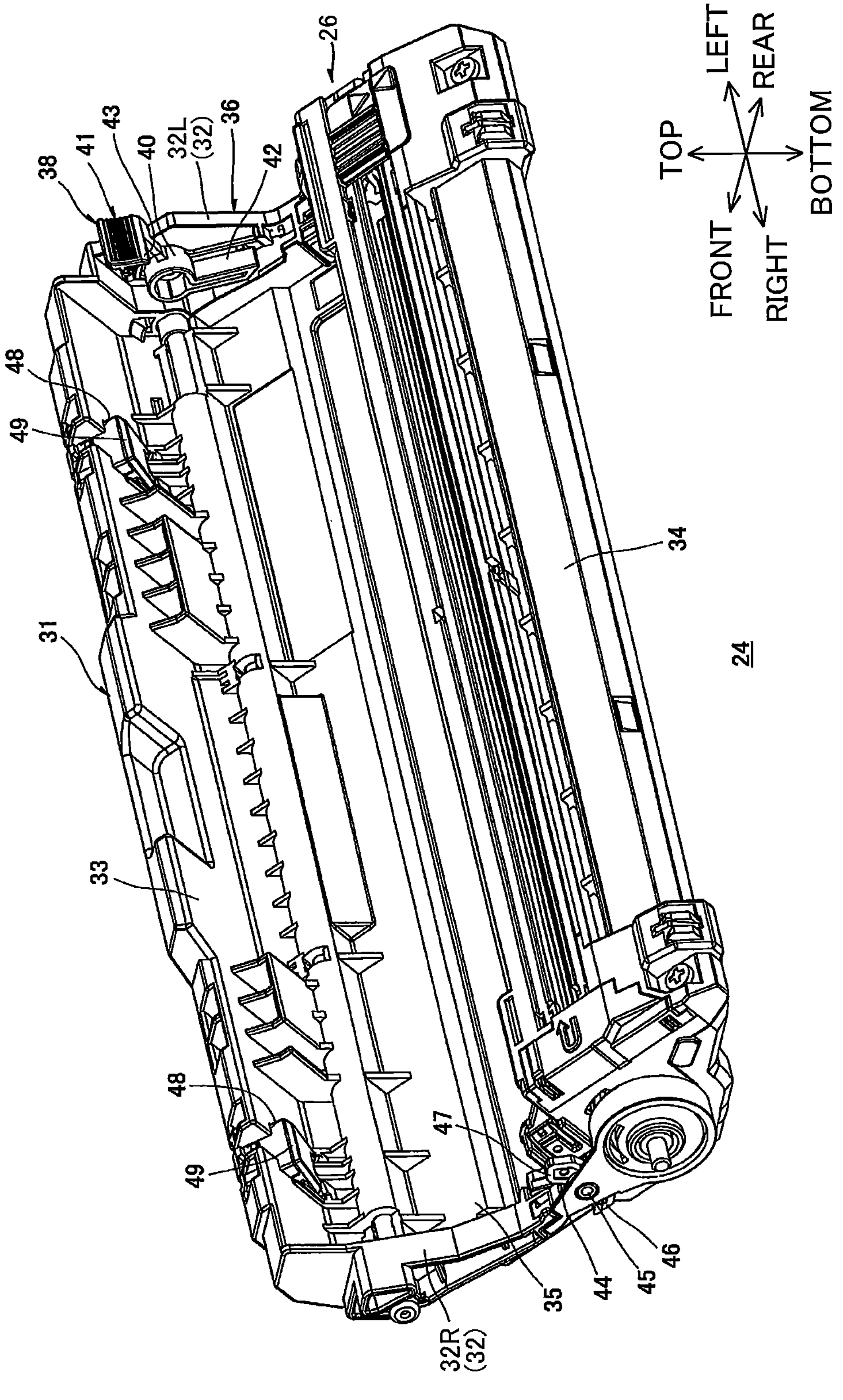
FIG. 2 is a perspective view of a drum cartridge shown in FIG. 1, as viewed from an upper rear side thereof.

As shown in FIG. 2, the drum cartridge 24 includes a drum frame 31. The drum frame 31 is formed in a generally rectangular frame-like shape with a bottom wall.

The drum frame 31 has a right and left pair of side walls 32, a front wall 33, a bottom wall 35, and a top wall 34. Hereinafter, the side wall 32 on the right side will be referred to as the right side wall 32R, and the side wall 32 on the left side will be referred to as a left side wall 32L when it is necessary to distinguish between the two.

Each of the side walls 32R, 32L is formed in a generally rectangular shape in a side view and elongated in the frontward/rearward direction (specifically, in a direction from an upper front side to a lower rear side of the drum frame 31).

The front wall 33 bridges a front edge of the right side wall 32R and a front edge of the left side wall 32L. The front wall 33 is formed in a generally flat plate shape that is elongated in the rightward/leftward direction. The front wall 33 is provided with two pressure member retaining portions 48. Within each of the pressure member retaining portions 48, a pressure member 49 is retained.

One of the pressure member retaining portions 48 is disposed at a right end portion of the front wall 33, and remaining one of the pressure member retaining portions 48 is disposed at a left end portion of the front wall 33. Each of the pressure member retaining portions 48 is formed in a generally rectangular shape in a front view. More specifically, each of the pressure member retaining portions 48 is depressed frontward from a rear surface of the front wall 33.

Each pressure member 49 is formed in a generally square pillar shape in a front view. Each pressure member 49 is urged by an urging member 50 (FIG. 7) so as to normally protrude rearward (diagonally below and rearward in FIG. 7) from the corresponding pressure member retaining portion 48.

The bottom wall 35 bridges a bottom edge of the right side wall 32R and a bottom edge of the left side wall 32L. The bottom wall 35 is connected to a bottom edge of the front wall 33. The bottom wall 35 is formed in a generally flat plate shape that is elongated in the frontward/rearward direction and in the rightward/leftward direction.

The top wall 34 bridges an upper edge of a rear portion of the right side wall 32R and an upper edge of a rear portion of the left side wall 32L. The top wall 34 is formed in a generally flat plate shape that is elongated in the rightward/leftward direction. The top wall 34 is disposed so as to cover the photosensitive drum 15 from a top side thereof. Further, the top wall 34 supports the Scorotron charger 26.

Within the drum frame 31, a developing cartridge mounting portion 36 is defined by a front half portion of the bottom wall 35, the pair of side walls 32 and the front wall 33 corresponding to the front half portion of the bottom wall 35, and a front edge of the top wall 34. The developing cartridge mounting portion 36 is adapted to accommodate the developing cartridge 25 therein.

(1-2) Lock Lever

A lock lever 38 as is provided at a front end portion of the developing cartridge mounting portion 36 of the drum cartridge 24 at a position rightward (laterally inward) of the left side wall 32L. The lock lever 38 is adapted to maintain the developing cartridge 25 in a mounted state.

The lock lever 38 is integrally provided with a pivot shaft 40, an operation portion 41 extending upward from the pivot shaft 40, and a lift portion 42 extending diagonally below and rearward from the pivot shaft 40.

The pivot shaft 40 is formed in a generally cylindrical shape extending in the rightward/leftward direction.

Figure 6A:
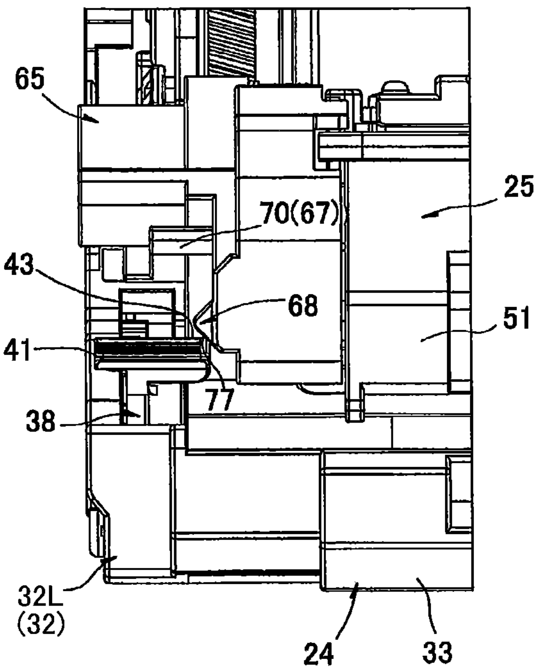

The operation portion 41 is formed in a generally lever shape extending upward from the pivot shaft 40. The operation portion 41 protrudes upward than an upper edge of the left side wall 32L. The operation portion 41 has an upper portion at which a restricting portion 43 is provided. The restricting portion 43 is formed in a generally flat plate shape that is elongated in the rightward/leftward direction. The restricting portion 43 has a right edge that protrudes rightward than a right edge of the pivot shaft 40. The right edge of the restricting portion 43 thus protrudes into an attachment and detachment path of the developing cartridge 25 relative to the drum cartridge 24 (FIG. 6A).

The lift portion 42 is formed in a generally lever shape extending diagonally below and rearward from the pivot shaft 40.

The lock lever 38 is pivotally movably supported to the left side wall 32L by a left end portion of the pivot shaft 40.

The lock lever 38 is pivotally movable about an axis of the pivot shaft 40 between a lock portion (FIG. 2) in which the operation portion 41 upstands and an unlock position (not shown) in which the operation portion 41 is inclined.

The lock lever 38 is urged by an urging member (not shown) in a clockwise direction as viewed from a right side, so that the lock lever 38 is normally positioned at the lock position.

(1-3) Separating Member

Figure 5:
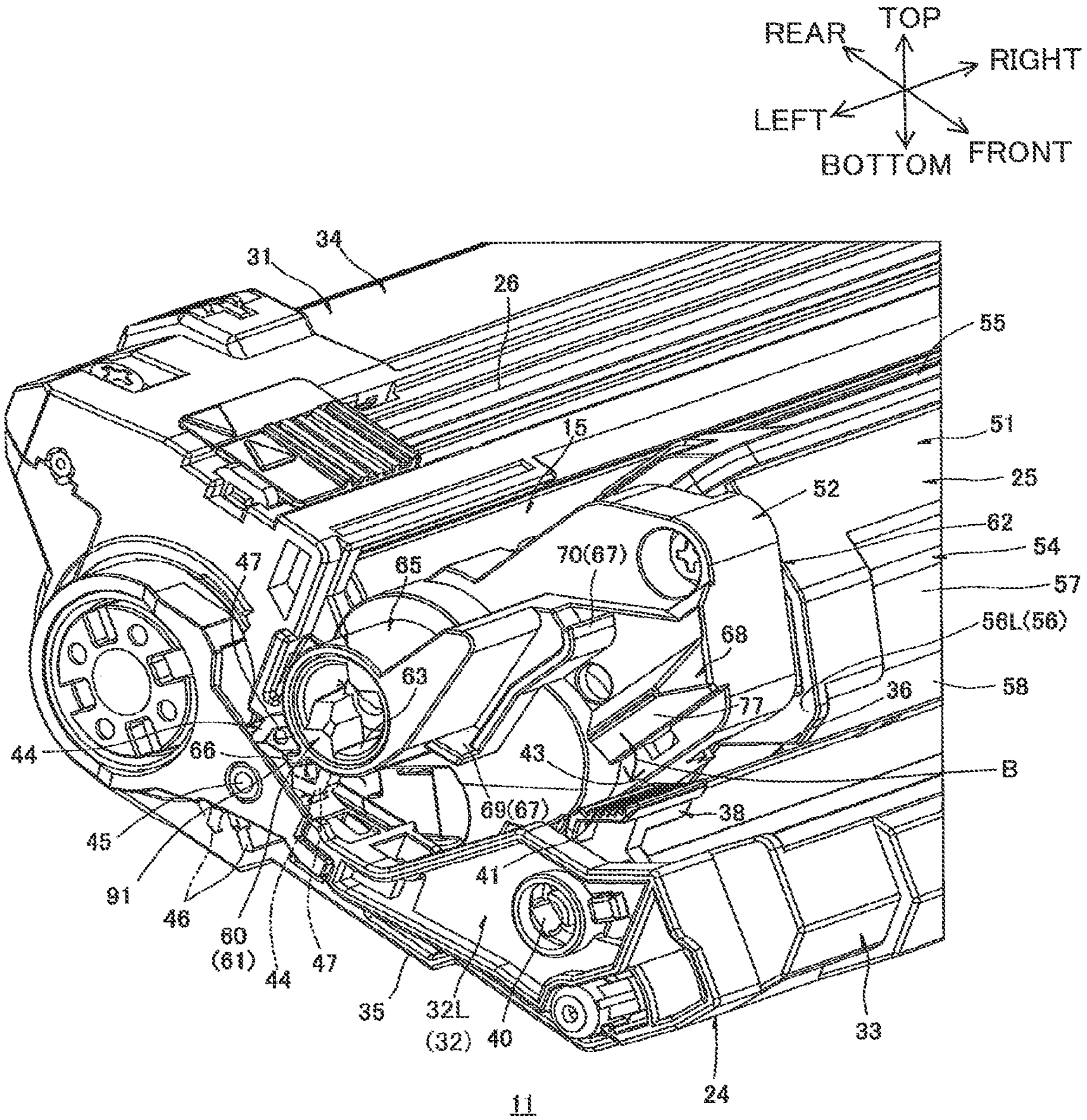
FIG. 5 is an explanatory diagram illustrating attachment of the developing cartridge relative to the drum cartridge.

As shown in FIGS. 2 and 5, a right and left pair of separating members 44 is provided at a rear end portion of the developing cartridge mounting portion 36 of the drum cartridge 24. More specifically, the right separating member 44 is disposed at an outer surface of the right side wall 32R, and the left separating member 44 is disposed at an outer surface of the left side wall 32L.

Each separating member 44 is integrally provided with a pivot shaft 45, a contacted portion 46, and a pressing portion 47.

The pivot shaft 45 is formed in a generally cylindrical shape extending in the rightward/leftward direction.

The contacted portion 46 is formed in a generally flat plate shape extending downward from a lower portion of the pivot shaft 45. The contacted portion 46 has a lower portion bending forward.

The pressing portion 47 is formed in a generally flat plate shape extending upward from an upper portion of the pivot shaft 45. The pressing portion 47 has an upper portion bending forward.

Each separating member 44 is supported to the corresponding side wall 32 and pivotally movable about an axis of the pivot shaft 45.

Each separating member 44 is pivotally movable about the axis of the pivot shaft 45 between a pressure position in which the pressing portion 47 protrudes frontward (diagonally above and frontward in FIG. 9) and a pressure release position in which the pressing portion 47 is retracted rearward (diagonally below and rearward in FIG. 7).

(2) Developing Cartridge

Figure 3:
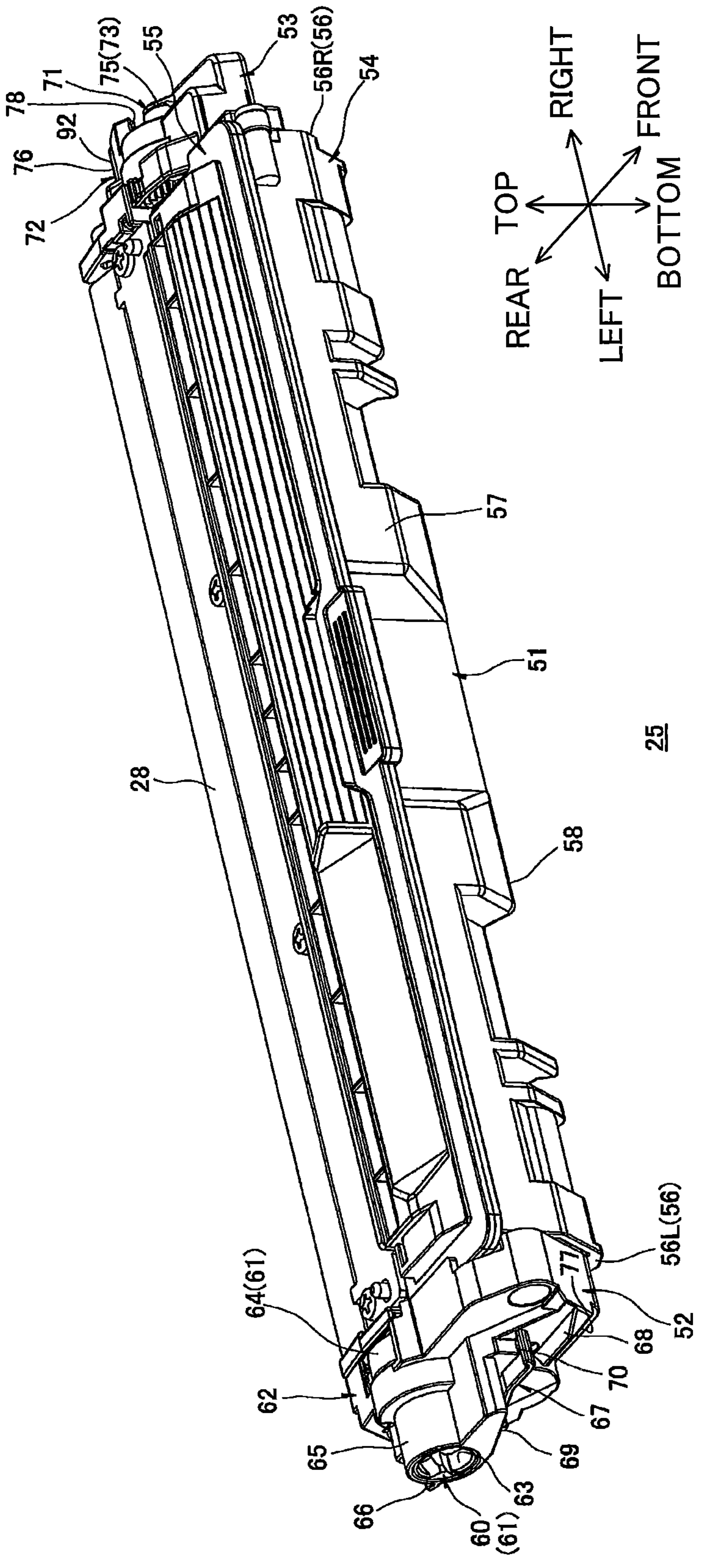
FIG. 3 is a perspective view of a developing cartridge shown in FIG. 1, as viewed from an upper left side thereof.

Note that, unless otherwise specified, directions related to the developing cartridge 25 in the following description will be referred based on its position when the developing cartridge is disposed at a horizontal plane in an orientation such that a bottom wall 58 of the developing cartridge 25 is positioned at a bottom side thereof (FIG. 3). Further, a side of the developing cartridge 25 at which the developing roller 16 is positioned will be referred to as a rear side, and a side of the developing cartridge 25 at which the thickness-regulating blade 28 is positioned will be referred to as a top side.

Figure 4:
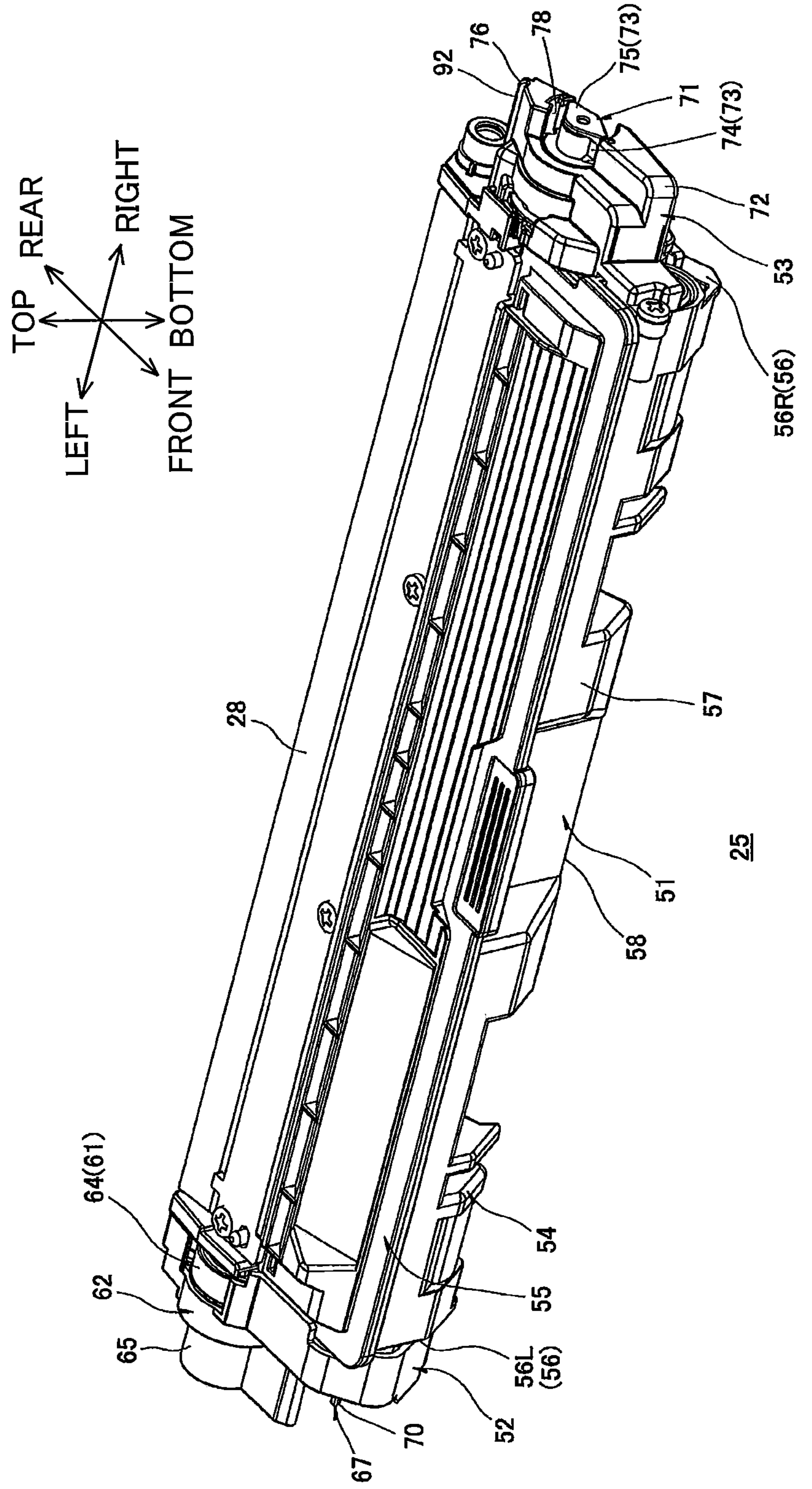
FIG. 4 is a perspective view of the developing cartridge shown in FIG. 1, as viewed from an upper right side thereof.

As shown in FIGS. 3 and 4, the developing cartridge 25 includes the cartridge frame 51, a drive unit 52 provided at a position leftward of the cartridge frame 51, and a detection unit 53 provided at a position rightward of the cartridge frame 51.

(2-1) Cartridge Frame

The cartridge frame 51 is formed in a generally box shape that is elongated in the rightward/leftward direction. The developing roller 16 is rotatably supported to the cartridge frame 51. The cartridge frame 51 is provided with a first frame 54 constituting a lower portion of the cartridge frame 51, and a second frame 55 constituting an upper portion of the cartridge frame 51.

The first frame 54 is formed in a generally box shape with top and rear openings. The first frame 54 is integrally provided with a right and left pair of side walls 56, a front wall 57, and a bottom wall 58.

Hereinafter, the side wall 56 on the right side will be referred to as the right side wall 56R, and the side wall 56 on the left side will be referred to as a left side wall 56L when it is necessary to distinguish between the two.

Each side wall 56 is formed in a rectangular shape in a side view that is elongated in a vertical direction and in the frontward/rearward direction. The right side wall 56R and the left side wall 56L is arranged in confrontation with and spaced apart from each other in the rightward/leftward direction.

The front wall 57 is elongated in the rightward/leftward direction, and bridges a front edge of the right side wall 56R and a front edge of the left side wall 56L.

The bottom wall 58 is elongated in the rightward/leftward direction. The bottom wall 58 is connected to a lower edge of the front wall 57, and bridges a lower edge of the right side wall 56R and a lower edge of the left side wall 56L.

The second frame 55 is formed in a generally rectangular flat plate shape in a plan view, and connected to front portions of the right and left side walls 56 and an upper edge of the front wall 57. The second frame 55 has a rear portion at which the thickness-regulating blade 28 is disposed such that the thickness-regulating blade 28 contacts the developing roller 16 from a top side thereof.

(2-2) Drive Unit

As shown in FIGS. 3 and 5, the drive unit 52 includes a developing coupling 61 and a drive unit side gear cover 62.

The developing coupling 61 is rotatably supported to the left side wall 56L. The developing coupling 61 is integrally provided with a coupling portion 60 and a gear portion 64. The developing coupling 61 is rotatable about an axis A2 (FIGS. 7 and 8) of the coupling portion 60.

The coupling portion 60 is formed in a generally cylindrical shape extending in the rightward/leftward direction. The coupling portion 60 has a left end wall formed with a recessed connection portion 63.

The recessed connection portion 63 is depressed rightward from the left end wall of the coupling portion 60 and elongated in the radial direction of the coupling portion 60. The recessed connection portion 63 has a generally elongated shape in a side view with a center portion in the radial direction having a narrow width. Incidentally, the main casing 2 is provided with a main casing coupling (not shown), and a leading end of the main casing coupling is non-rotatably inserted into the recessed connection portion 63 when the developing cartridge 25 is mounted in the main casing 2. A drive force generated on the main casing 2 side is inputted into the developing coupling 61 through the main casing coupling (not shown).

The gear portion 64 is disposed at a right end portion of the coupling portion 60 across the entire outer peripheral surface thereof. The gear portion 64 is adapted to transmit a drive force to the developing roller 16 and the supply roller 27 via a gear train (not shown).

The drive unit side gear cover 62 is formed in a generally square pillar shape whose left end is closed, and elongated in the rightward/leftward direction. The drive unit side gear cover 62 has a size (a vertical dimension and a front-to-rear dimension) substantially the same as that of the left side wall 56L of the developing cartridge 25. The drive unit side gear cover 62 covers at least a part of the gear portion 64.

The drive unit side gear cover 62 is provided with a coupling collar 65, a first engagement portion 66, an operated portion 67, and a guided portion 68.

The coupling collar 65 is formed in a generally cylindrical shape protruding leftward from a left side wall of the drive unit side gear cover 62 at a substantially front-to-rear center portion of the drive unit side gear cover 62. The coupling collar 65 has a right end portion in communication with an interior of the drive unit side gear cover 62.

The first engagement portion 66 is a protrusion protruding rearward from a rear edge of the coupling collar 65 and also elongated in the rightward/leftward direction. The first engagement portion 66 is adapted to move the developing roller 16 away from the photosensitive drum 15 and to be abuttable on the corresponding separating member 44. The first engagement portion 66 is positioned between the axis A2 of the coupling portion 60 and the axis A1 of the developing roller 16 such that a rear surface 91 of the first engagement portion 66 is overlapped with the developing roller 16 when projected in the rightward/leftward direction (FIG. 7). The rear surface 91 (FIG. 7) of the first engagement portion 66 is a plane extending in the vertical direction (in a direction from a lower front side to an upper rear side of the process cartridge 11 in FIG. 7). The rear surface 91 is perpendicular to a confronting direction in which the photosensitive drum 15 confronts the developing roller 16 (a direction from a lower rear side to an upper front side of the process cartridge 11 in FIG. 7).

The operated portion 67 is integrally provided with a pressed portion 69 and a restricted portion 70.

The pressed portion 69 is connected to a front edge of the coupling collar 65. The pressed portion 69 is a protrusion that protrudes leftward from a left surface of the drive unit side gear cover 62. The pressed portion 69 also extends in the frontward/rearward direction.

The restricted portion 70 is connected to a front edge of the pressed portion 69. The restricted portion 70 is a protrusion that protrudes leftward from the left surface of the drive unit side gear cover 62. The restricted portion 70 extends diagonally frontward and upward from the front edge of the pressed portion 69. That is, the restricted portion 70 is disposed opposite to the first engagement portion 66 with respect to the coupling portion 60.

The guided portion 68 is spaced apart from a front portion of the restricted portion 70 at a position downward of the restricted portion 70. The guided portion 68 is formed in a generally wedge shape that protrudes leftward from the left surface of the drive unit side gear cover 62. The guided portion 68 has a lower surface 77 sloping upward toward a left side thereof. The guided portion 68 is adapted to be abuttable on the lock lever 38.

Further, the drive unit side gear cover 62 is fixed to the left side wall 56L by screws such that a left end portion of the developing coupling 61 is fitted into the coupling collar 65. Incidentally, the recessed connection portion 63 is exposed through a left end portion of the coupling collar 65.

(2-3) Detection Unit

As shown in FIG. 4, the detection unit 53 includes a detection gear 71 and a detection unit side gear cover 72.

The detection gear 71 is rotatably supported to the right side wall 56R. The detection gear 71 is formed in a generally cylindrical shape extending in the rightward/leftward direction. The detection gear 71 is integrally provided with a detected end portion 73.

The detected end portion 73 is disposed at a right end portion of the detection gear 71. The detected end portion 73 includes a pair of detected portions 74 and a connection portion 75.

Each detected portion 74 is disposed at each end portion of the detection gear 71 in a radial direction of the detection gear 71. Each detected portion 74 is formed in a generally pillar shape extending in the rightward/leftward direction.

The connection portion 75 has a generally flat plate shape and also has a generally rhombus shape in a side view. The connection portion 75 is connected to right edges of the detected portions 74.

A drive force from the developing coupling 61 is transmitted to the detection gear 71 via the gear train (not shown). When a new and unused developing cartridge 25 is mounted in the main casing 2, the detection gear 71 rotates at a predetermined driving amount. At this time, each detected portion 74 is detected by a detection unit (not shown) provided at the main casing 2. Based on this detection, information related to the developing cartridge 25 (new or used, and type) is determined on the main casing 2 side.

The detection unit side gear cover 72 is formed in a generally square pillar shape whose right end is closed, and elongated in the rightward/leftward direction. The detection unit side gear cover 72 has a size (a vertical dimension and a front-to-rear dimension) sufficient to cover the detection gear 71. That is, the detection unit side gear cover 72 covers at least a part of the detection gear 71.

Further, the detection unit side gear cover 72 is formed with a detection gear exposure opening 78. Further, the detection unit side gear cover 72 is provided with a second engagement portion 76.

The detection gear exposure opening 78 has a generally circular shape in a side view. The detection gear exposure opening 78 penetrates a right side wall of the detection unit side gear cover 72 at a substantially front-to-rear center portion of the detection unit side gear cover 72 so that the detected end portion 73 of the detection gear 71 is exposed through the detection gear exposure opening 78.

Figure 8:
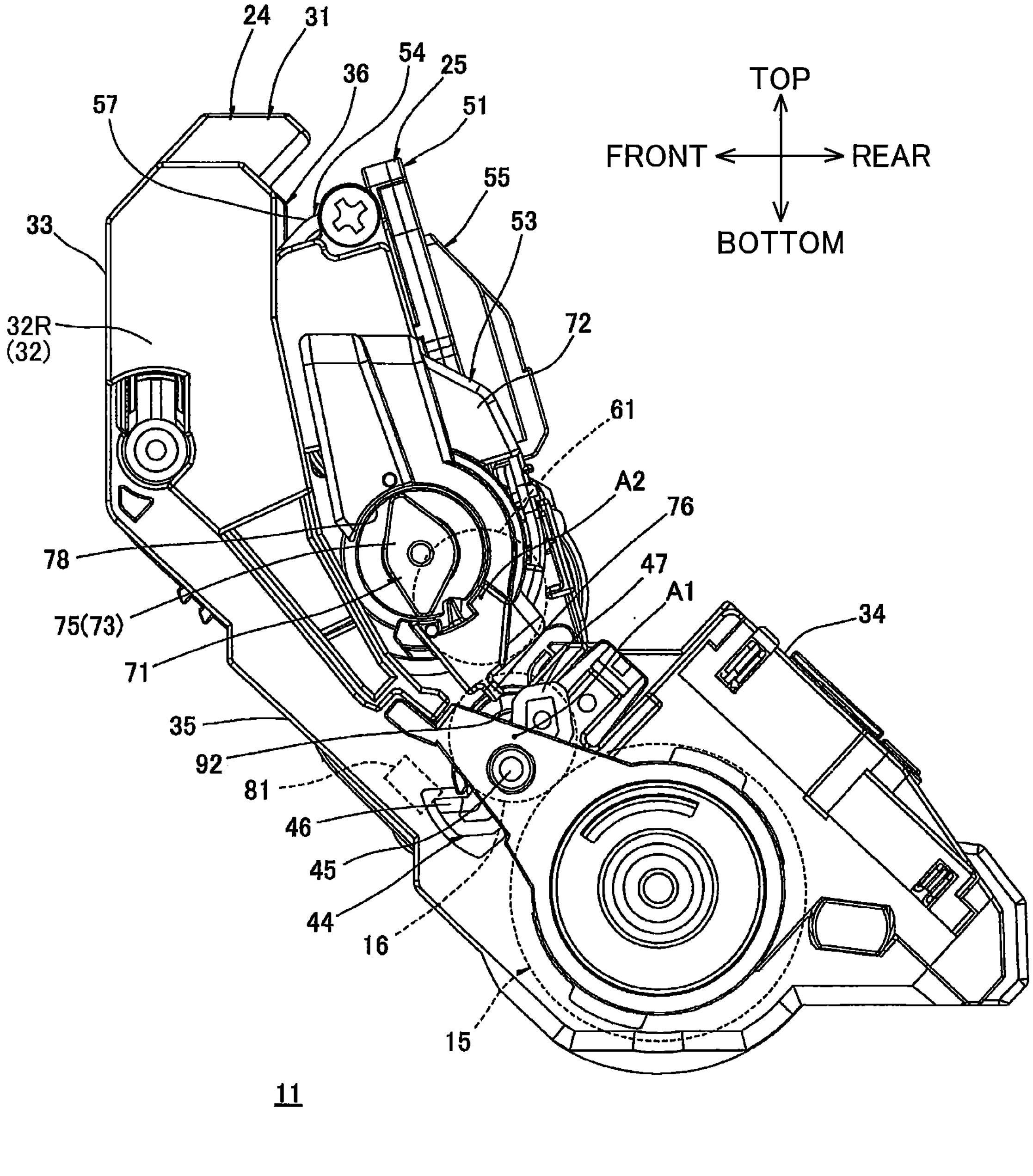
FIG. 8 is a right side view of the process cartridge in such a state that the process cartridge is mounted in the printer shown in FIG. 1, in which the developing roller and the photosensitive drum are in contact with each other (contact state)

The second engagement portion 76 is a protrusion protruding rearward from a rear edge of the detection unit side gear cover 72 and also elongated in the rightward/leftward direction. The second engagement portion 76 is adapted to move the developing roller 16 away from the photosensitive drum 15 and to be abuttable on the corresponding separating member 44. The second engagement portion 76 is positioned between the axis A2 of the coupling portion 60 and the axis A1 of the developing roller 16 such that a rear surface 92 of the second engagement portion 76 is overlapped with the developing roller 16 when projected in the rightward/leftward direction (FIG. 8). The rear surface 92 (FIG. 8) of the second engagement portion 76 is a plane extending in the vertical direction (in the direction from the upper rear side to the lower front side of the process cartridge 11 in FIG. 8), in the same manner as the rear surface 91 of the first engagement portion 66. The rear surface 92 is perpendicular to the confronting direction in which the photosensitive drum 15 confronts the developing roller 16 (the direction from the lower rear side to the upper front side of the process cartridge 11 in FIG. 8).

Further, the detection unit side gear cover 72 is fixed to the right side wall 56R by screws such that the detected end portion 73 of the detection gear 71 is exposed through the detection gear exposure opening 78.

3. Attachment and Detachment of Developing Cartridge Relative to Drum Cartridge

In order to mount the process cartridge 11 in the main casing 2, initially, the developing cartridge 25 is attached to the drum cartridge 24.

To attach the developing cartridge 25 to the drum cartridge 24, as shown in FIG. 5, a rear end portion of the developing cartridge 25 is inserted into a rear end portion of the developing cartridge mounting portion 36.

Then, the developing roller 16 is brought into contact with the photosensitive drum 15 from a front side thereof. Further, the guided portion 68 confronts the restricting portion 43 of the lock lever 38 from a top side thereof.

Next, a front end portion of the developing cartridge 25 is pushed into a front end portion of the developing cartridge mounting portion 36 so that the front end portion of the developing cartridge 25 is pivotally moved about the rear end portion of the developing cartridge 25 as indicated by an arrow B in FIG. 5 in a clockwise direction as viewed from a left side.

Then, as shown in FIG. 6A, the lower surface 77 of the guided portion 68 of the developing cartridge 25 is brought into abutment with the right edge of the restricting portion 43 of the lock lever 38 from a top side thereof.

When the front end portion of the developing cartridge 25 is further pushed into the front end portion of the developing cartridge mounting portion 36, the developing cartridge 25 is pushed rightward while guided by the sloped lower surface 77 of the guided portion 68, and the front end portion of the developing cartridge 25 is inserted into the front end portion of the developing cartridge mounting portion 36.

At the same time, the lock lever 38 is pressed frontward by the guided portion 68 of the developing cartridge 25, and pivotally moved in the clockwise direction as viewed from a left side against the urging force from the urging member (not shown).

Figure 6B:
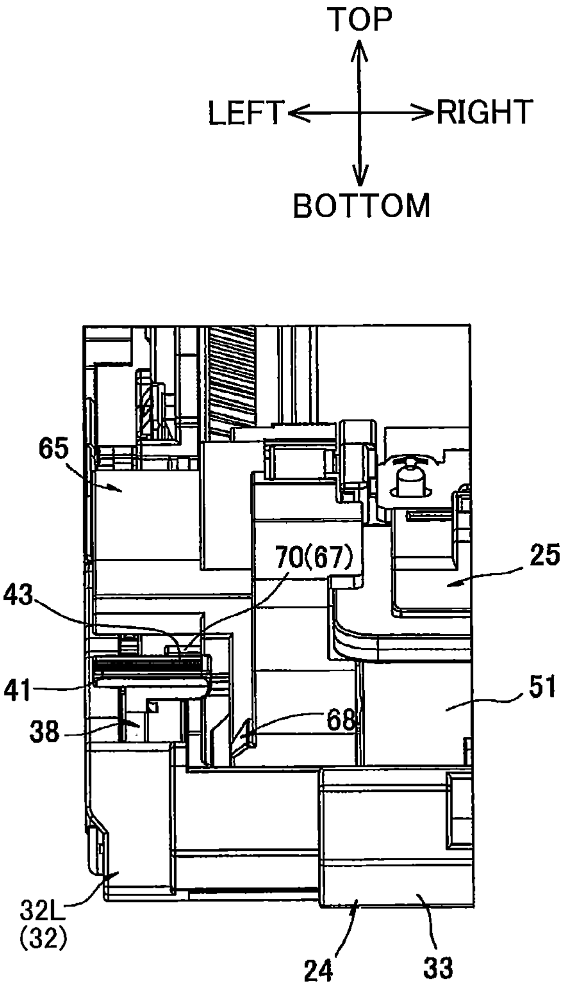

Further, when the front end portion of the developing cartridge 25 is still further pushed into the front end portion of the developing cartridge mounting portion 36, as shown in FIG. 6B, the guided portion 68 is moved past the lock lever 38 at a right front side thereof. Hence, the developing cartridge 25 is completely mounted in the developing cartridge mounting portion 36.

Upon completion of mounting of the developing cartridge 25 in the developing cartridge mounting portion 36, abutment of the guided portion 68 with the lock lever 38 is released.

As a result, the lock lever 38 is pivotally moved in the counterclockwise direction as viewed from a left side by the urging force from the urging member (not shown). Hence, the lock lever 38 is again positioned at the lock position.

At this time, the restricting portion 43 of the lock lever 38 confronts the restricted portion 70 of the developing cartridge 25 from a top side thereof. When the developing cartridge 25 is pivotally moved in the counterclockwise direction as viewed from a left side, the restricting portion 43 of the lock lever 38 is brought into engagement with the restricted portion 70 of the developing cartridge 25. Hence, the restricting portion 43 of the lock lever 38 restricts further pivotal movement of the developing cartridge 25 in the counterclockwise direction as viewed from a left side. The lock lever 38 thus prohibits detachment of the developing cartridge 25 relative to the drum cartridge 24.

Further, when the lock lever 38 is positioned at the lock position, the lift portion 42 of the lock lever 38 confronts the pressed portion 69 of the developing cartridge 25 from a bottom side thereof.

Figure 7:
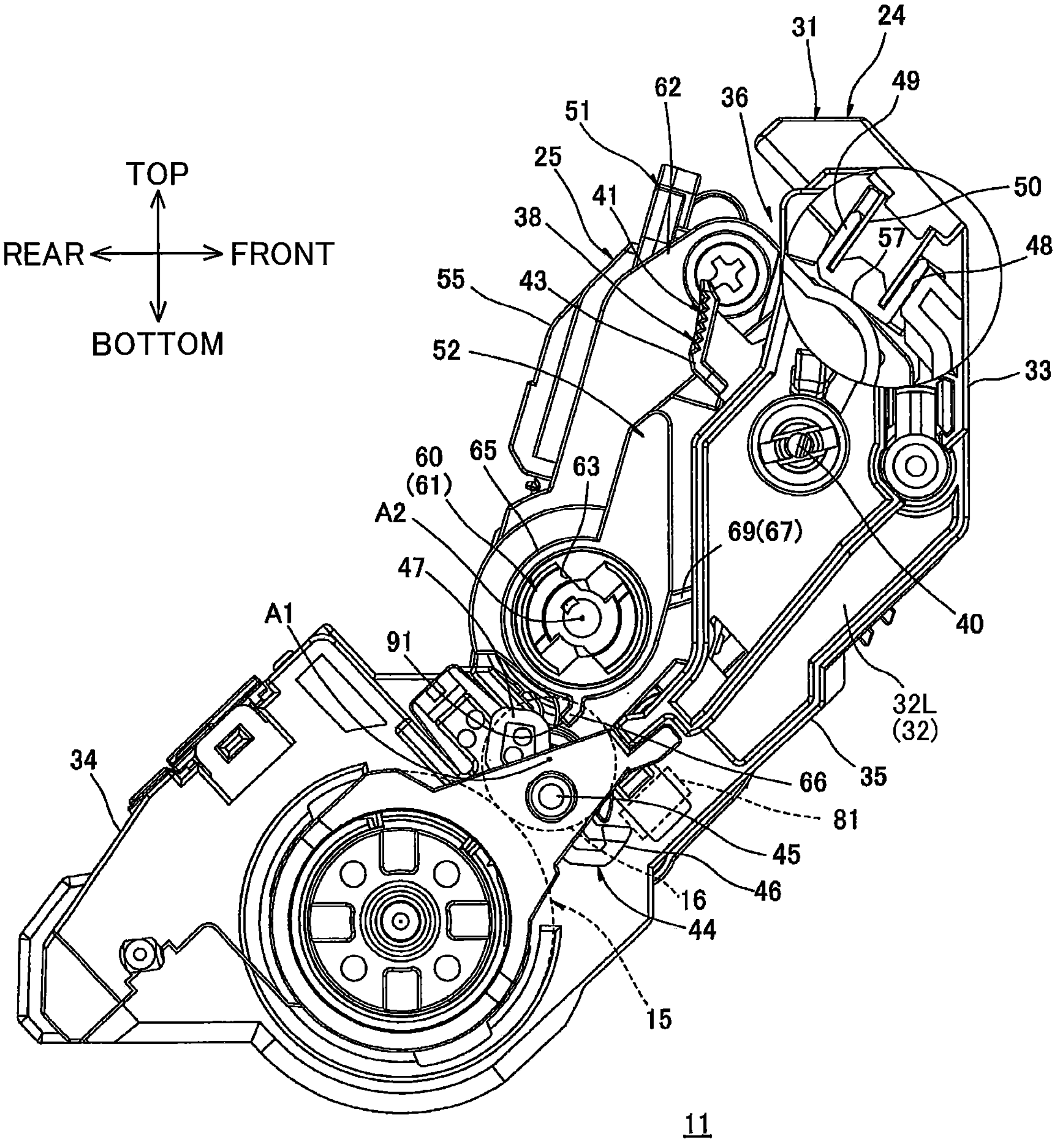
FIG. 7 is a left side view of the process cartridge in such a state that the process cartridge is mounted in the printer shown in FIG. 1, in which a developing roller and a photosensitive drum are in contact with each other (contact state)

Further, when the developing cartridge 25 has been completely mounted in the developing cartridge mounting portion 36, as shown in FIG. 7, the pressure members 49 are in abutment with the front wall 57 of the cartridge frame 51 of the developing cartridge 25 from a front side thereof (an upper front side in FIG. 7). The developing cartridge 25 is therefore normally pressed rearward (diagonally below and rearward in FIG. 7) by the urging force from the urging members 50 that respectively urge the pressure members 49 while the developing cartridge 25 is accommodated in the developing cartridge mounting portion 36.

Further, the first engagement portion 66 of the drive unit side gear cover 62 confronts the corresponding separating member 44 from a front side thereof (an upper front side in FIG. 7), and the second engagement portion 76 of the detection unit side gear cover 72 confronts the corresponding separating member 44 from a front side thereof (an upper front side in FIG. 8).

Incidentally, the operated portion 67 (the pressed portion 69 and the restricted portion 70) and the guided portion 68 may be provided at the detection unit side gear cover 72, and the lock lever 38 may be pivotally movably supported to the right side wall 32R.

Next, an operation for detaching the developing cartridge 25 from the drum cartridge 24 will be described. To detach the developing cartridge 25 from the drum cartridge 24, initially, the operation portion 41 of the lock lever 38 is pressed, thereby pivotally moving the lock lever 38 in the clockwise direction as viewed from a left side against the urging force from the urging member (not shown). The lock lever 38 is thus positioned at the unlock position (not shown).

Then, the restricting portion 43 of the lock lever 38 is retracted frontward from a top side of the restricted portion 70 of the developing cartridge 25. At this time, the pressed portion 69 of the developing cartridge 25 is pressed upward by the lift portion 42 of the lock lever 38 to permit detachment of the developing cartridge 25 from developing cartridge mounting portion 36.

As a result, the front end portion of the developing cartridge 25 is lifted upward, thereby moving the developing cartridge 25 away from the developing cartridge mounting portion 36 of the drum cartridge 24.

Then, the user holds the front end portion of the developing cartridge 25 to move the developing cartridge 25 upward, thereby detaching the developing cartridge 25 from the developing cartridge mounting portion 36 of the drum cartridge 24.

Detachment of the developing cartridge 25 from the drum cartridge 24 is thus completed.

To mount the process cartridge 11 in the main casing 2, as shown in FIG. 1, the top cover 6 is opened. The process cartridge 11 is positioned at a predetermined position within the main casing 2, and mounted in the main casing 2 from a top side thereof such that the rear portion of the process cartridge 11 is disposed at a lower rear side of the printer 1 and the front portion of the process cartridge 11 is disposed at an upper front side of the printer 1.

Mounting of the process cartridge 11 in the main casing 2 is thus completed.

4. Separation of Developing Cartridge from Photosensitive Drum

When a color image is printed in the printer 1, the developing roller 16 of each developing cartridge 25 is in contact with the corresponding photosensitive drum 15 (FIG. 1).

However, when a monochromatic image (black color image) is printed, the developing roller 16 is in contact with the corresponding photosensitive drum 15 in the black process cartridge 11K while each developing roller 16 is moved away from the corresponding photosensitive drum 15 in the color process cartridges 11 (i.e. the yellow process cartridge 11Y, the magenta process cartridge 11M, and the cyan process cartridge 11C). That is, each developing roller 16 is movable away from the corresponding photosensitive drum 15 frontward (frontward and upward in FIGS. 7 and 8). The direction in which the developing roller 16 is moved away from the corresponding photosensitive drum 15 corresponds to a separating direction and a perpendicular direction perpendicular to the axial direction.

Figure 9:
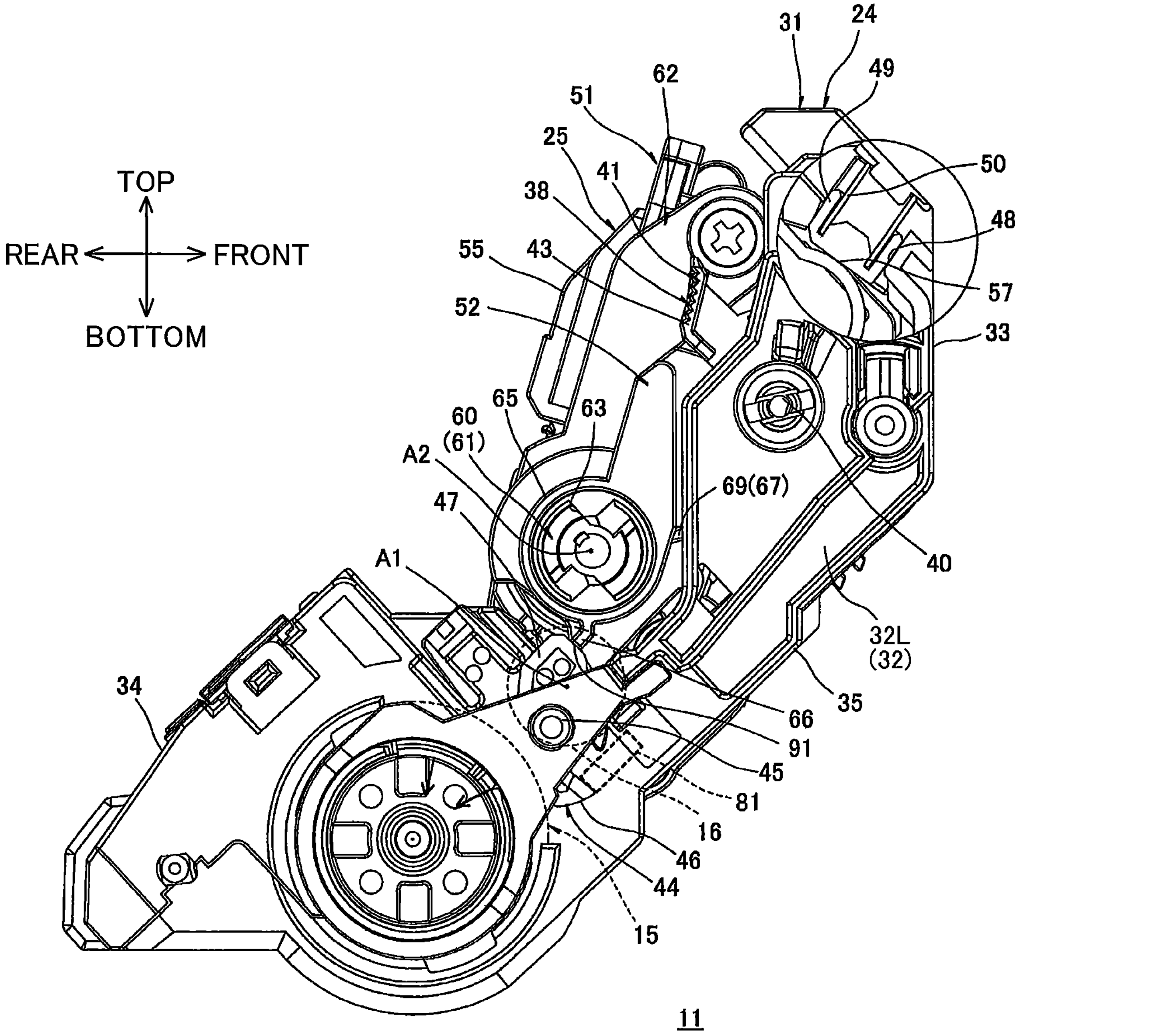
FIG. 9 is a left side view of the process cartridge in such a state that the process cartridge is mounted in the printer shown in FIG. 1, in which the developing roller and the photosensitive drum are spaced apart from each other (separation state)

To separate the developing roller 16 from the photosensitive drum 15, as shown in FIGS. 7, 8, and 9, a pair of levers 81 is provided at the main casing 2 (indicated by broken lines in FIGS. 7, 8, and 9).

Each lever 81 is adapted to push the contacted portion 46 of each separating member 44 rearward (downward and rearward in FIGS. 7 and 8), which causes the separating member 44 to pivotally move in the clockwise direction as viewed from a left side. The pressing portion 47 of the left separating member 44 is therefore brought into abutment with the first engagement portion 66 of the drive unit side gear cover 62 from a rear side thereof (a lower rear side in FIG. 7), and also the pressing portion 47 of the right separating member 44 is brought into abutment with the second engagement portion 76 of the detection unit side gear cover 72 from a rear side thereof (a lower rear side in FIG. 8).

As both of the separating members 44 are further pivotally moved by the levers 81 in the clockwise direction as viewed from a left side, the pressing portion 47 of the left separating member 44 presses the rear surface 91 of the first engagement portion 66 forward (forward and upward in FIG. 9, separating direction), and the pressing portion 47 of the right separating member 44 presses the rear surface 92 of the second engagement portion 76 forward.

The developing cartridge 25 is thus moved forward (forward and upward in FIG. 9, separating direction) against the urging force from the pressure members 49, as shown in FIG. 9.

As a result, the developing roller 16 is moved away from the photosensitive drum 15.

5. Operations and Effects (1) According to the above-described process cartridge 11, as shown in FIGS. 3 and 4, the drive unit side gear cover 62 of the developing cartridge 25 includes the first engagement portion 66, and the detection unit side gear cover 72 includes the second engagement portion 76. Each of the first engagement portion 66 and the second engagement portion 76 is engageable with the separating member 44 of the drum cartridge 24.

Therefore, it is not necessary to provide an engagement portion at the cartridge frame 51, avoiding the drive unit side gear cover 62 and the detection unit side gear cover 72. Accordingly, the first engagement portion 66 and the second engagement portion 76 are positionally efficiently arranged. Thus, a compact developing cartridge 25 can be provided.

Further, while the first engagement portion 66 can be provided at the drive unit side gear cover 62 and the second engagement portion 76 can be provided at the detection unit side gear cover 72. The degree of freedom in design of the developing cartridge 25 can therefore be increased.

(2) Further, according to the above-described process cartridge 11, as shown in FIGS. 7 and 8, the first engagement portion 66 has the rear surface 91 extending in a direction perpendicular to the confronting direction in which the developing roller 16 and the photosensitive drum 15 confront each other (the direction from the upper front side to the lower rear side of the process cartridge 11). Likewise, the second engagement portion 76 has the rear surface 92 extending in a direction perpendicular to the confronting direction.

With this configuration, the rear surface 91 of the first engagement portion 66 and the rear surface 92 of the second engagement portion 76 can be stably pressed diagonally upward and frontward (in the direction in which the developing roller 16 is separated from the photosensitive drum 15). Hence, the developing roller 16 can be stably moved away from the photosensitive drum 15.

(3) Further, according to the above-described process cartridge 11, as shown in FIGS. 7 and 8, each of the rear surface 91 of the first engagement portion 66 and the rear surface 92 of the second engagement portion 76 is overlapped with the developing roller 16 when projected in the rightward/leftward direction.

With this configuration, the developing roller 16 can be separated from the photosensitive drum 15 by pressing the rear surface 91 of the first engagement portion 66 and the rear surface 92 of the second engagement portion 76 at a position adjacent to the developing roller 16.

Therefore, separation of the developing roller 16 from the photosensitive drum 15 can be reliably achieved.

(4) Further, according to the above-described process cartridge 11, as shown in FIG. 5, the drive unit side gear cover 62 includes the restricted portion 70 abuttable on the restricting portion 43 of the lock lever 38 of the drum cartridge 24.

With this configuration, while the degree of freedom in designing the developing cartridge 25 can be increased, detachment of the developing cartridge 25 from the drum cartridge 24 can be restricted.

(5) Further, according to the above-described process cartridge 11, as shown in FIGS. 7 and 8, the restricted portion 70 is positioned frontward of the developing coupling 61 when projected in the rightward/leftward direction.

With this configuration, detachment of the developing cartridge 25 from the drum cartridge 24 can be restricted at a position frontward of the developing roller 16 and relatively away from the developing roller 16.

(6) Further, according to the above-described process cartridge 11, as shown in FIG. 5, the drive unit side gear cover 62 includes the pressed portion 69 that is pressed by the lift portion 42 of the lock lever 38 of the drum cartridge 24.

With this configuration, while the degree of freedom in design of the developing cartridge 25 can be increased, the developing cartridge 25 can be lifted up from the drum cartridge 24 using the drive unit side gear cover 62.

(7) Further, according to the above-described process cartridge 11, as shown in FIG. 5, the pressed portion 69 and the restricted portion 70 are connected to each other. This configuration can easily provide strength with the pressed portion 69 and the restricted portion 70.

(8) Further, according to the above-described process cartridge 11, as shown in FIG. 5, the drive unit side gear cover 62 includes the guided portion 68. The guided portion 68 is abuttable on the lock lever 38 of the drum cartridge 24, thereby pressing the guided portion 68 rightward.

In conjunction with abutment of the guided portion 68 of the drive unit side gear cover 62 with the lock lever 38, the developing cartridge 25 can be pressed rightward. Since the right edge of the developing cartridge 25 aligns against the right side wall 32R of the drum cartridge 24, the developing cartridge 25 can be subjected to positioning relative to the drum cartridge 24.

(9) Further, according to the above-described process cartridge 11, as shown in FIGS. 7 and 8, the drum cartridge 24 includes the pair of separating members 44 for pressing the first engagement portion 66 and the second engagement portion 76 frontward and upward (in the direction in which the developing roller 16 is moved away from the photosensitive drum 15).

Therefore, separation of the developing cartridge 25 from the photosensitive drum 15 can be reliably achieved.

6. Second Embodiment

Figure 10:
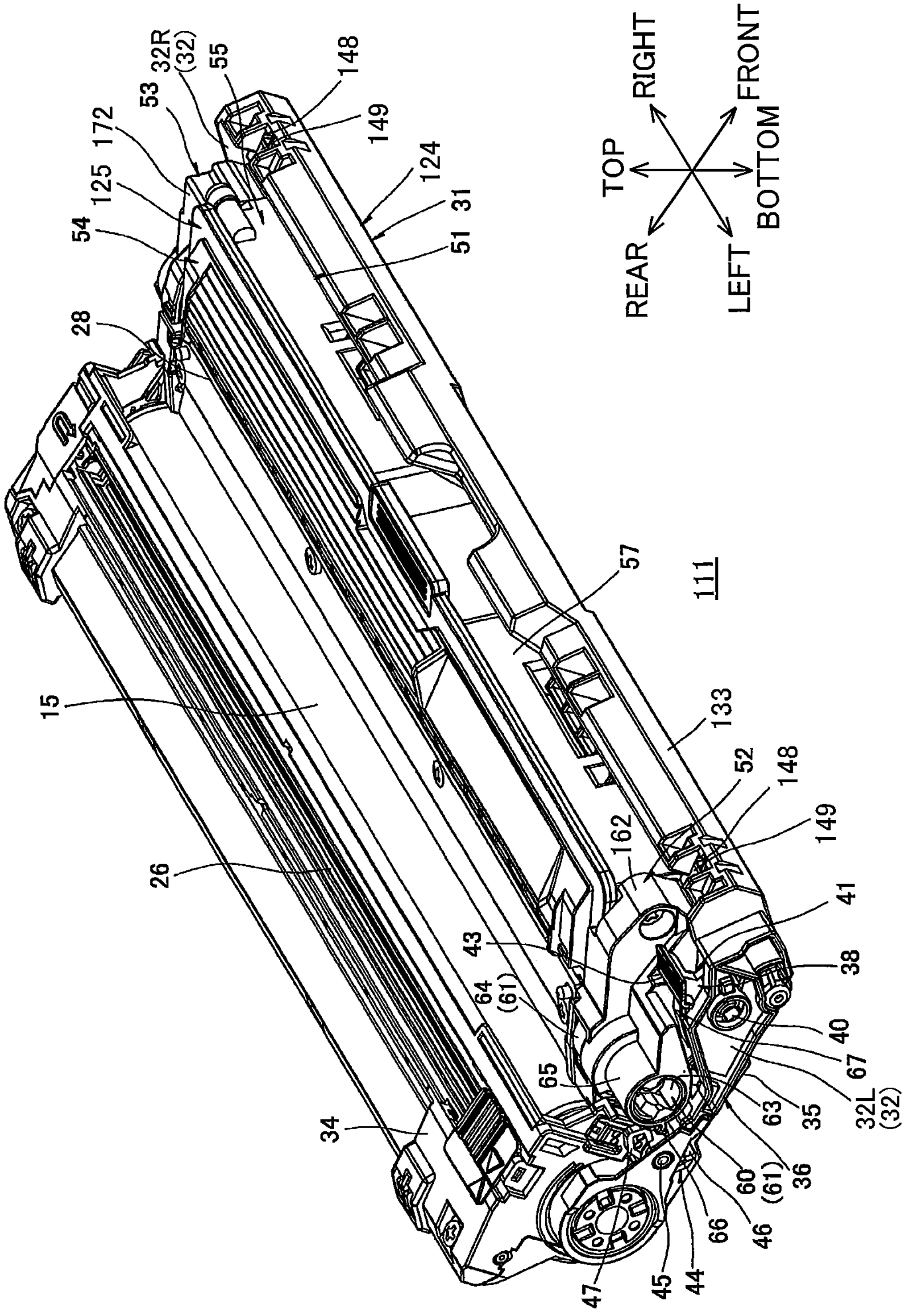
FIG. 10 is a perspective view of process cartridge according to a second embodiment of the present invention, as viewed from an upper left side thereof.
Figure 11:
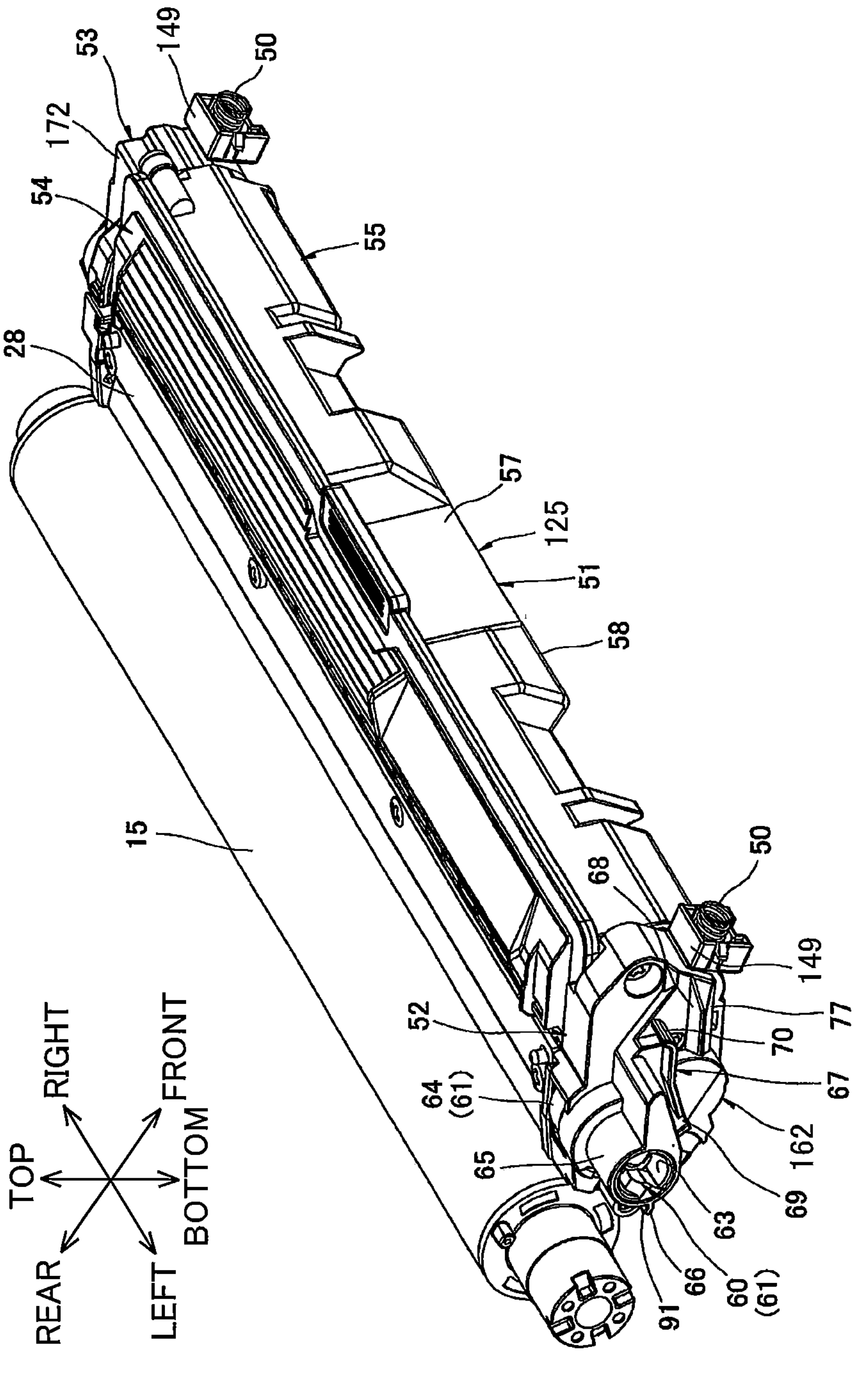
FIG. 11 is an explanatory diagram illustrating pressure from the developing cartridge relative to the photosensitive drum in the process cartridge shown in FIG. 10.

A process cartridge 111 including a drum cartridge 124 and a developing cartridge 125 according to a second embodiment of the present invention will be described while referring to FIGS. 10 and 11.

In the following description, parts and components appearing in the second embodiment and the same as those in the first embodiment will be designated by the same reference numerals as those in the first embodiment to avoid duplicating description, and only parts and components differing from those of the first embodiment will be described.

In the above-described first embodiment, each pressure member 49 is brought into abutment with the front wall 57 of the cartridge frame 51 of the developing cartridge 25 from a front side thereof, thereby pressing the developing cartridge 25 rearward. However, in the second embodiment, as shown in FIGS. 10 and 11, the drum cartridge 124 is provided with two pressure members 149, one adapted to press a front edge of the drive unit side gear cover 62 and another adapted to press a front edge of the detection unit side gear cover 72. More specifically, one of the pressure members 149 is brought into abutment with the front edge of the drive unit side gear cover 62 from a front side thereof to press the developing cartridge 25 rearward. Likewise, remaining one of the pressure members 149 is brought into abutment with the front edge of the detection unit side gear cover 72 from a front side thereof to press the developing cartridge 25 rearward.

A front wall 133 of the drum cartridge 124 is provided with two pressure member retaining portions 48. One of the pressure members 149 is retained in one of the pressure member retaining portions 148 provided at a left end portion of the front wall 133 so as to confront the drive unit side gear cover 62 from a front side thereof. Likewise, remaining one of the pressure members 149 is retained in remaining one of the pressure member retaining portions 148 provided at a right end portion of the front wall 133 so as to confront the detection unit side gear cover 72 from a front side thereof.

Further, a drive unit side gear cover 162 of the drive unit 52 is formed in a generally square pillar shape, and has a lower front edge formed in a generally arcuate shape in a side view.

Further, a detection unit side gear cover 172 of the detection unit 53 is formed in a generally square pillar shape, and has a lower front edge formed in a generally arcuate shape in a side view. More specifically, the detection unit side gear cover 172 has a front portion having a shape substantially the same as that of the cartridge frame 51 when projected in the rightward/leftward direction. The detection unit side gear cover 172 has such a size (a front-to-rear dimension and a vertical dimension) that the front portion of the cartridge frame 51 can be overlapped with (cover) the front portion of the detection unit side gear cover 172 when projected in the rightward/leftward direction.

In such a state that the developing cartridge 125 is attached to the drum cartridge 124, one of the pressure members 149 is abuttable on the lower front edge of the drive unit side gear cover 162 (a portion having an arcuate shape in a side view) from a front side thereof, and remaining one of the pressure members 149 is abuttable on the lower front edge of the detection unit side gear cover 172 (a portion having an arcuate shape in a side view) from a front side thereof. The developing cartridge 125 is therefore normally pressed rearward by an urging force of the urging members 50 that urges the respective pressure members 149.

In other words, the lower front edge of the drive unit side gear cover 162 (the portion having an arcuate shape in a side view) and the lower front edge of the detection unit side gear cover 172 (the portion having an arcuate shape in a side view) are pressed by the respective pressure members 149 in a direction in which the developing roller 16 contacts the photosensitive drum 15.

According to the second embodiment, the developing roller 16 is pressed toward the photosensitive drum 15 using the drive unit side gear cover 162 and the detection unit side gear cover 172.

In the second embodiment, operations and effects similar to those of the first embodiment can also be obtained.

7. Third Embodiment

A process cartridge 211 including a drum cartridge 224 and a developing cartridge 225 according to a third embodiment of the present invention will be described while referring to FIGS. 12 through 16.

In the following description, parts and components appearing in the third embodiment and the same as those in the first embodiment will be designated by the same reference numerals as those in the first embodiment to avoid duplicating description, and only parts and components differing from those of the first embodiment will be described.

Figure 12:
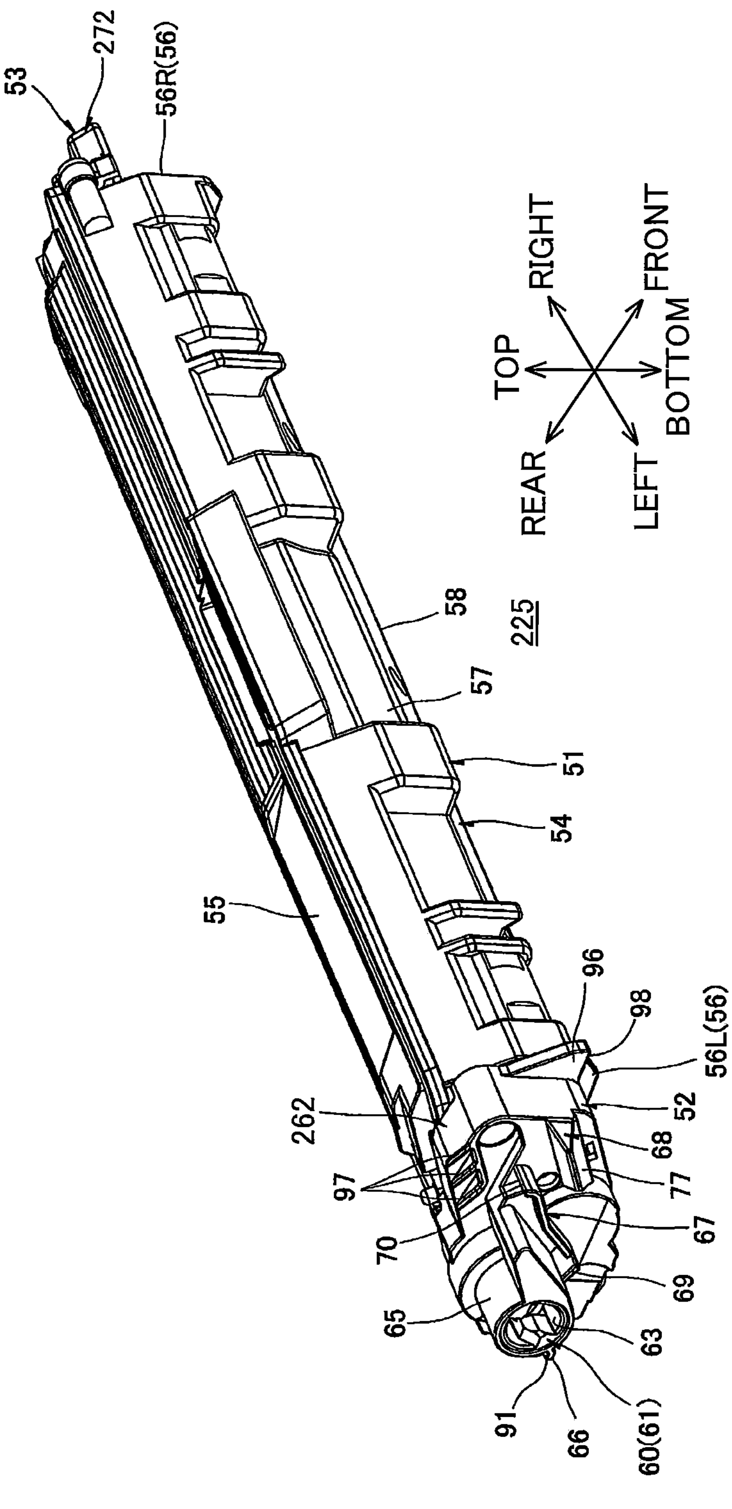
FIG. 12 is a perspective view of a developing cartridge according to a third embodiment of the present invention, as viewed from an upper left side thereof.

In the third embodiment, as shown in FIG. 12, the developing cartridge 225 is provided with a drive unit side gear cover 262 and a detection unit side gear cover 272. The drive unit side gear cover 262 has an attachment operation guide 96 and three detachment operation guides 97. The attachment operation guide 96 is adapted to guide a user's attachment operation for attaching the developing cartridge 225 to the drum cartridge 224. The detachment operation guides 97 are adapted to guide a user's detachment operation for detaching the developing cartridge 225 from the drum cartridge 224. The attachment operation guide 96 and the detachment operation guide 97 may be provided at the detection unit side gear cover 272.

The attachment operation guide 96 is generally flat plate-like shaped, having a generally triangle shape in a side view. The attachment operation guide 96 protrudes frontward from a front surface of the drive unit side gear cover 262 at a right end portion of the drive unit side gear cover 262. The attachment operation guide 96 has a bottom surface 98, extending linearly in the frontward/rearward direction in a side view.

Further, the drum cartridge 24 has a front wall 233 whose rear end wall is formed with a guide accommodating opening 99. The guide accommodating opening 99 penetrates the rear end wall. The guide accommodating opening 99 is adapted to accommodate the attachment operation guide 96 therein.

The guide accommodating opening 99 has a generally rectangular shape elongated in the vertical direction along a movement path of the attachment operation guide 96 (indicated by an imaginary line C in each of FIGS. 14 and 15) during the attachment operation of the developing cartridge 225 to the drum cartridge 224.

Three detachment operation guides 97 are arranged juxtaposed with and spaced apart from each other in the frontward/rearward direction (specifically, in FIG. 12, a direction from an upper front side to a lower rear side of the developing cartridge 225). Each detachment operation guide 97 is generally flat plate-like shaped, having a generally triangle shape in a front view, protruding leftward from a left surface of an upper front end portion of the drive unit side gear cover 262.

To attach the developing cartridge 225 to the drum cartridge 224, in the same manner as the first embodiment described above, the user initially inserts the rear end portion of the developing cartridge 225 into the rear end portion of the developing cartridge mounting portion 36.

Figure 13:
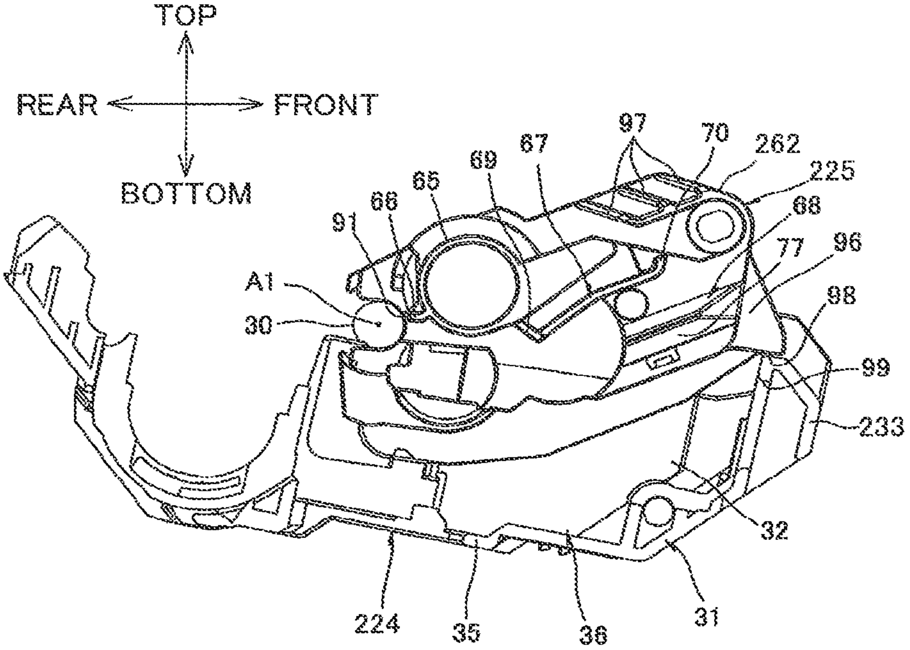
FIG. 13 is an explanatory diagram illustrating attachment of the developing cartridge shown in FIG. 12 to a drum cartridge, in which a rear end portion of the developing cartridge is not sufficiently inserted into a cartridge mounting portion of the drum cartridge, and an operation guide of the developing cartridge is in contact with a front wall of the drum cartridge from a top side thereof.

Here, as shown in FIG. 13, if the rear end portion of the developing cartridge 225 is not sufficiently inserted into the developing cartridge mounting portion 36, the attachment operation guide 96 is brought into abutment with the front wall 33 of the drum cartridge 224 from a top side thereof.

Abutment of the attachment operation guide 96 with the front wall 33 restricts further downward movement of the front end portion of the developing cartridge 225 into the developing cartridge mounting portion 36.

Thus, the user has to stop further attachment operation of the developing cartridge 225 to the drum cartridge 224. As a result, the user can realize that insertion of the rear end portion of the developing cartridge 225 into the developing cartridge mounting portion 36 is insufficient.

Figure 14:
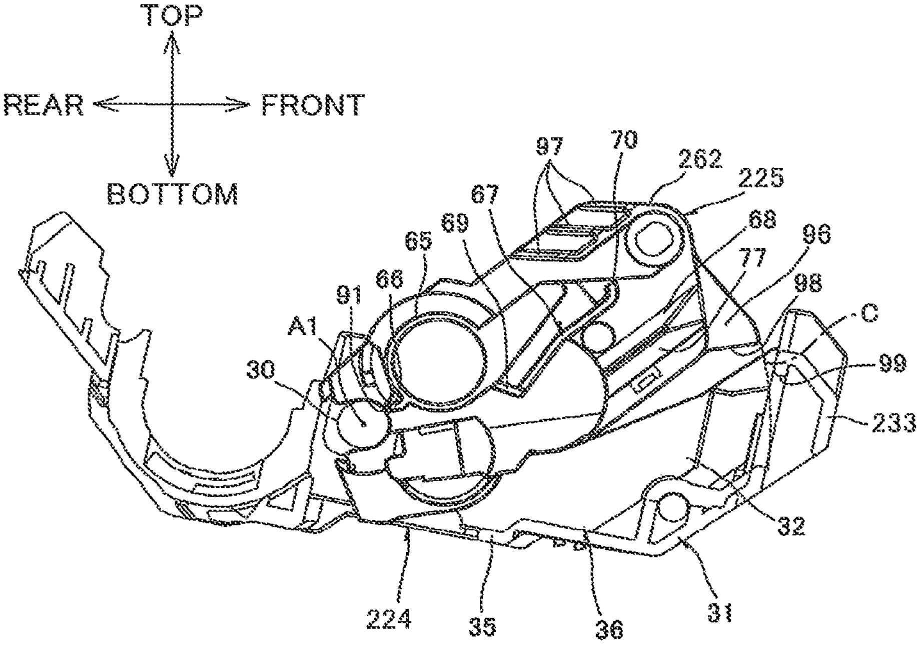
FIG. 14 is an explanatory diagram illustrating the attachment of the developing cartridge shown in FIG. 12 to the drum cartridge, following FIG. 13, in which the rear end portion of the developing cartridge is sufficiently mounted in the cartridge mounting portion of the drum cartridge, and the operation guide is positioned rearward of the front wall of the drum cartridge.
Figure 15:
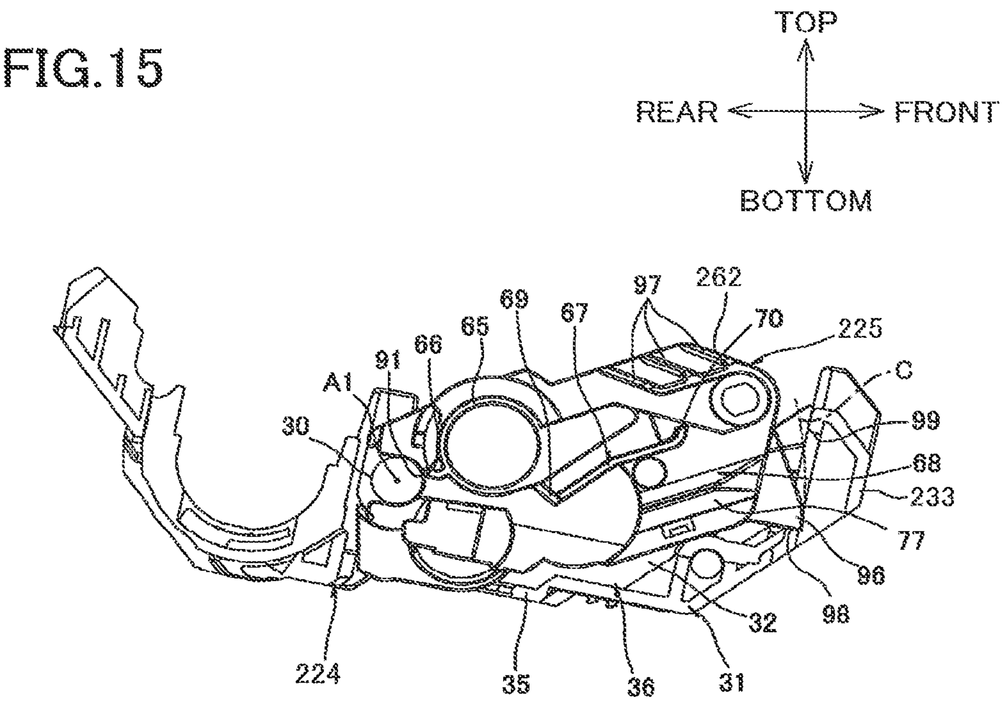
FIG. 15 is an explanatory diagram illustrating the attachment of the developing cartridge shown in FIG. 12 to the drum cartridge, following FIG. 14, in which attachment of the developing cartridge to the drum cartridge has been completed.

Then, when the user adequately inserts the rear end portion of the developing cartridge 225 into the developing cartridge mounting portion 36, the developing roller 16 is brought into contact the photosensitive drum 15 from a front side thereof. Further, as shown in FIG. 14, the attachment operation guide 96 is positioned rearward of the front wall 33 of the drum cartridge 224.

Next, in the same manner as the first embodiment described above, the front end portion of the developing cartridge 225 is pushed into the front end portion of the developing cartridge mounting portion 36 so that the front end portion of the developing cartridge 225 is pivotally moved in the clockwise direction as viewed from a left side about the rear end portion of the developing cartridge 225.

Then, as described above, and as shown in FIG. 15, the developing cartridge 225 is completely mounted in the developing cartridge mounting portion 36. At this time, the front end portion of the attachment operation guide 96 is accommodated within the guide accommodating opening 99.

Attachment of the developing cartridge 225 to the drum cartridge 224 is thus completed.

Further, to detach the developing cartridge 225 from the drum cartridge 224, in the same manner as the first embodiment described above, the user presses the operation portion 41 of the lock lever 38 against the urging force from the urging member (not shown) of the lock lever 38 to pivotally move the lock lever 38 in the clockwise direction as viewed from a left side. The lock lever 38 is thus positioned at the unlock position (not shown).

Figure 16:
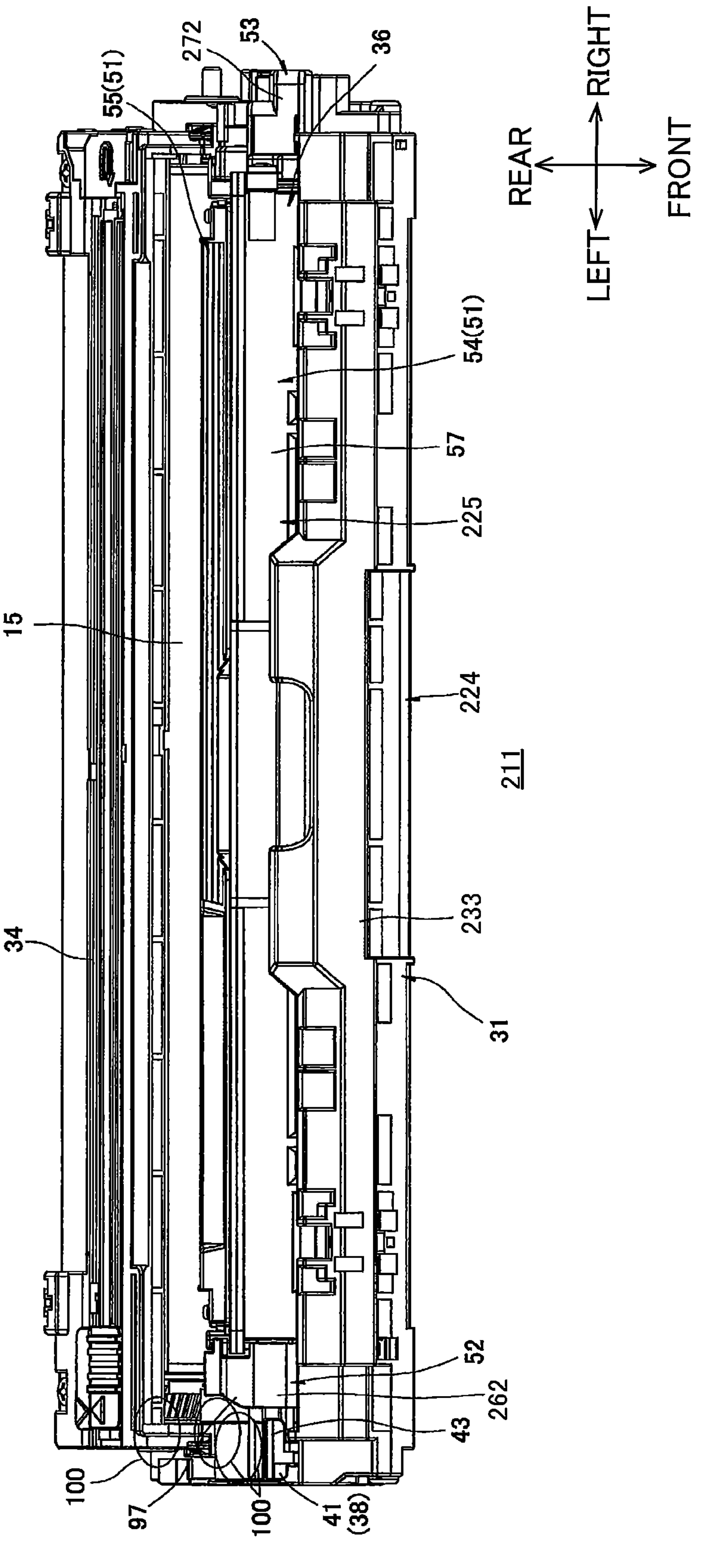
FIG. 16 is an explanatory diagram illustrating detachment of the developing cartridge shown in FIG. 12 from the drum cartridge.

At this time, as shown in FIG. 16, as the user moves his/her fingers 100 downward along the detachment operation guides 97 from a top side thereof, the user's fingers 100 are guided to the operation portion 41 of the thickness-regulating blade 28 along sloped surfaces of the detachment operation guides 97.

As described above, the restricting portion 43 of the lock lever 38 is retracted frontward from a top side of the restricted portion 70 of the developing cartridge 225. At this time, the lift portion 42 of the lock lever 38 presses the pressed portion 69 of the developing cartridge 225 upward, thereby lifting the front end portion of the developing cartridge 225 upward, and moving the developing cartridge 225 away from the developing cartridge mounting portion 36 of the drum cartridge 224.

The user then holds the front end portion of the developing cartridge 225 to move the developing cartridge 225 upward, thereby detaching the developing cartridge 225 from the developing cartridge mounting portion 36 of the drum cartridge 224.

Detachment of the developing cartridge 225 relative to the drum cartridge 24 is thus completed.

According to the third embodiment, when the user operates the operation portion 41, the user's fingers 100 can be guided to the operation portion 41, using the drive unit side gear cover 62.

In the third embodiment, operations and effects similar to those of the first embodiment can also be obtained.

While the present invention has been described in detail with reference to the present embodiments thereof, it would be apparent to those skilled in the art that various changes and modifications may be made therein without departing from the spirit of the present invention.

What is claimed is:

1. A developing cartridge comprising:

a developing roller extending in a first direction, the developing roller being rotatable about a developing axis extending in the first direction;

a frame configured to accommodate developing agent therein, the frame including one end portion and another end portion separated from the one end portion of the frame in a second direction, the developing roller being positioned at the one end portion of the frame;

a coupling rotatable about a coupling axis extending in the first direction, the coupling being positioned at one side of the frame in the first direction;

a cover being positioned at another side of the frame, the cover having a first distal end portion and a second distal end portion spaced apart from the first distal end portion of the cover in the second direction, the first distal end portion of the cover being closer to the developing roller than the second distal end portion of the cover is to the developing roller in the second direction; and a first engagement protrusion extending in the first direction, the first engagement protrusion being positioned at the another side of the frame, the first engagement protrusion being positioned at the first distal end portion of the cover;

wherein a distal end of the first engagement protrusion is positioned between the developing axis and the coupling axis in the second direction.

2. The developing cartridge according to claim 1, wherein the first engagement protrusion is positioned on the first distal end portion of the cover.

3. The developing cartridge according to claim 1, wherein the first engagement protrusion extends from the first distal end portion of the cover.

4. The developing cartridge according to claim 1, wherein the first engagement protrusion is integrally formed with the first distal end portion of the cover.

5. The developing cartridge according to claim 1, further comprising:

a coupling cover including a coupling collar extending in the first direction, the coupling collar covering a portion of the coupling, the coupling collar having an opening configured to allow a portion of the coupling to be exposed.

6. The developing cartridge according to claim 1, further comprising:

a second engagement protrusion extending in the first direction, the second engagement protrusion being positioned at the one side of the frame.

7. The developing cartridge according to claim 1, wherein the developing roller includes a developing roller shaft extending in the first direction.

8. The developing cartridge according to claim 7, wherein the first engagement protrusion is positioned between the developing roller shaft and the first distal end portion of the cover in the second direction.

9. The developing cartridge according to claim 1, wherein the first engagement protrusion protrudes toward the developing roller.

10. The developing cartridge according to claim 1, wherein the first engagement protrusion is abuttable on a separating member of a drum cartridge in a state where the developing cartridge is received in the drum cartridge.

11. The developing cartridge according to claim 1, further comprising:

a detection protrusion movable relative to the frame according to rotation of the coupling, the detection protrusion being positioned at the another side of the frame.

* * * * *